United States Patent
Sato

(10) Patent No.: US 8,555,614 B2
(45) Date of Patent: Oct. 15, 2013

(54) INTERNAL COMBUSTION ENGINE EXHAUST GAS CONTROL APPARATUS AND ABNORMALITY DETERMINING METHOD THEREOF

(75) Inventor: Makoto Sato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 185 days.

(21) Appl. No.: 13/029,671

(22) Filed: Feb. 17, 2011

(65) Prior Publication Data

US 2011/0225951 A1    Sep. 22, 2011

(30) Foreign Application Priority Data

Mar. 18, 2010   (JP) ................................. 2010-062844

(51) Int. Cl.
*F01N 3/00*   (2006.01)
(52) U.S. Cl.
USPC .......................................................... 60/277
(58) Field of Classification Search
USPC .......................................................... 60/277
See application file for complete search history.

(56) References Cited

U.S. PATENT DOCUMENTS

| | | | |
|---|---|---|---|
| 6,327,849 B1 * | 12/2001 | Sugiura et al. ................ | 60/277 |
| 7,694,508 B2 * | 4/2010 | Iida et al. ..................... | 60/285 |
| 8,205,435 B2 * | 6/2012 | Iida ............................. | 60/277 |
| 2007/0017212 A1 * | 1/2007 | Yamauchi et al. ............ | 60/277 |
| 2008/0257325 A1 * | 10/2008 | Takubo ........................ | 123/672 |
| 2009/0288391 A1 * | 11/2009 | Aoki ........................... | 60/273 |

FOREIGN PATENT DOCUMENTS

| | | |
|---|---|---|
| CN | 101479452 A | 7/2009 |
| JP | A-2000-27688 | 1/2000 |
| JP | A-2000-297630 | 10/2000 |
| JP | A-2003-343339 | 12/2003 |
| JP | A-2006-183591 | 7/2006 |
| JP | A-2006-275007 | 10/2006 |
| JP | A-2007-154749 | 6/2007 |
| JP | A-2008-8158 | 1/2008 |
| JP | A-2009-36172 | 2/2009 |

OTHER PUBLICATIONS

Dec. 13, 2011 Office Action issued in Japanese Patent Application No. 2010-062844 (with partial English-language translation).

* cited by examiner

*Primary Examiner* — Kenneth Bomberg
*Assistant Examiner* — Matthew T Largi
(74) *Attorney, Agent, or Firm* — Oliff and Berridge, PLC

(57) ABSTRACT

When it is estimated that an amount of oxygen stored in the catalyst is a maximum amount, an electronic control unit executes forced rich control and estimates a maximum oxygen release amount during a period between the start of this control and a rich reversal of an output of the oxygen sensor, based on this period of time. When it is estimated that the amount of oxygen stored in the catalyst is a minimum amount, the electronic control unit executes forced lean control and estimates a maximum oxygen storage amount during a period between the start of this control and a lean reversal of the output of the oxygen sensor, based on this period of time. If the absolute value of a difference between the maximum oxygen release amount and the maximum oxygen storage amount is equal to or greater than a predetermined value, an exhaust gas control apparatus and a method for determining an abnormality thereof determine that there is a response delay.

7 Claims, 9 Drawing Sheets

OUTPUT VOLTAGE Vaf OF AIR-FUEL RATIO SENSOR

OUTPUT VOLTAGE Vox OF OXYGEN SENSOR

OXYGEN RELEASE AMOUNT Crls FROM CATALYST

OXYGEN STORAGE AMOUNT Cstrg TO CATALYST

TIMING t

OUTPUT VOLTAGE Vaf OF AIR-FUEL RATIO SENSOR

OUTPUT VOLTAGE Vox OF OXYGEN SENSOR

OXYGEN RELEASE AMOUNT Crls FROM CATALYST

OXYGEN STORAGE AMOUNT Cstrg TO CATALYST

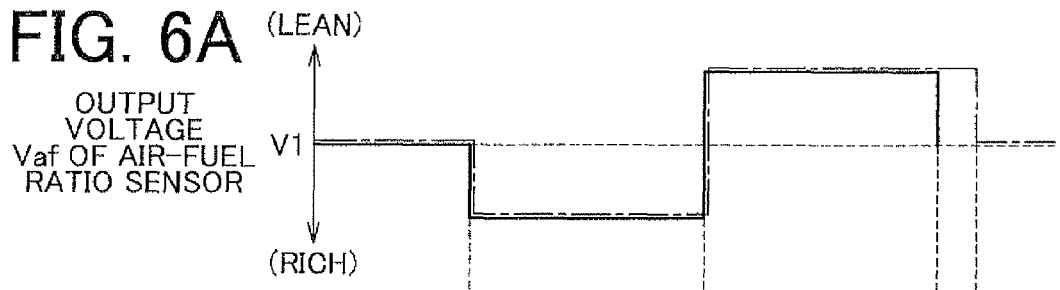
FIG. 6A OUTPUT VOLTAGE Vaf OF AIR-FUEL RATIO SENSOR
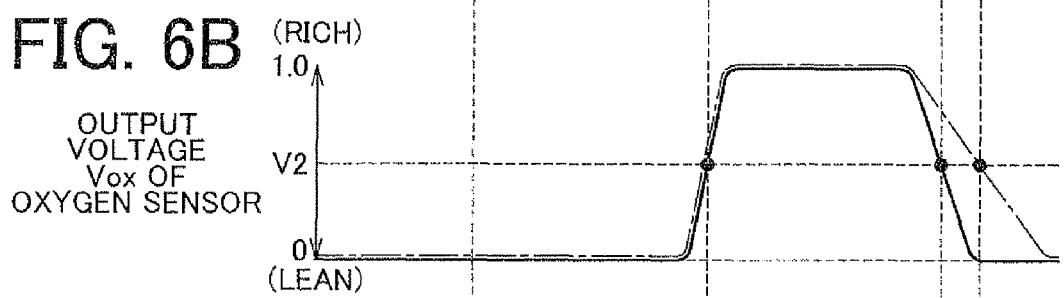
FIG. 6B OUTPUT VOLTAGE Vox OF OXYGEN SENSOR
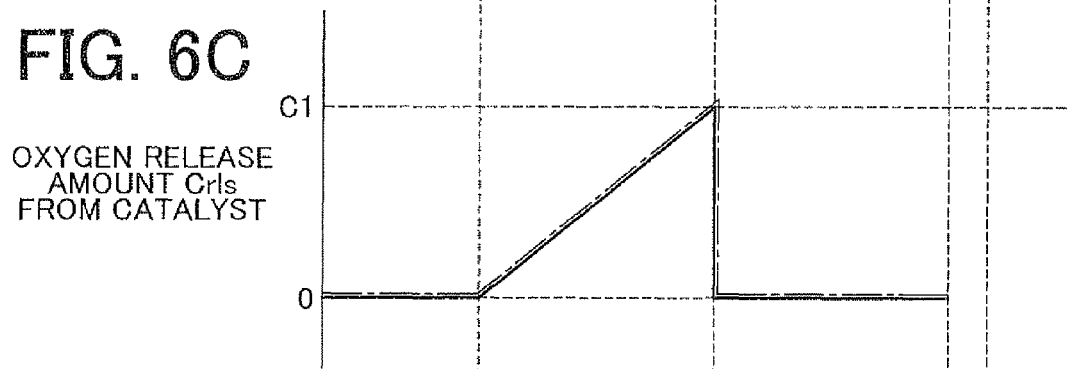
FIG. 6C OXYGEN RELEASE AMOUNT Crls FROM CATALYST
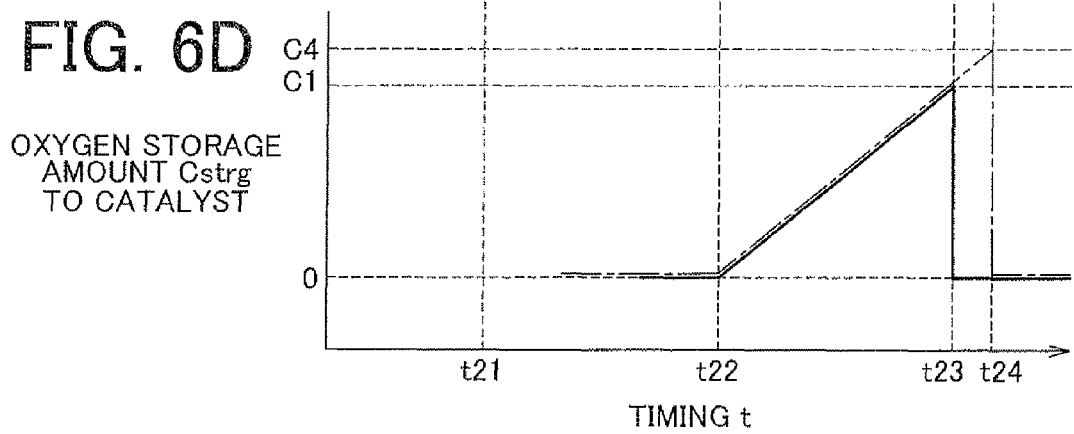
FIG. 6D OXYGEN STORAGE AMOUNT Cstrg TO CATALYST

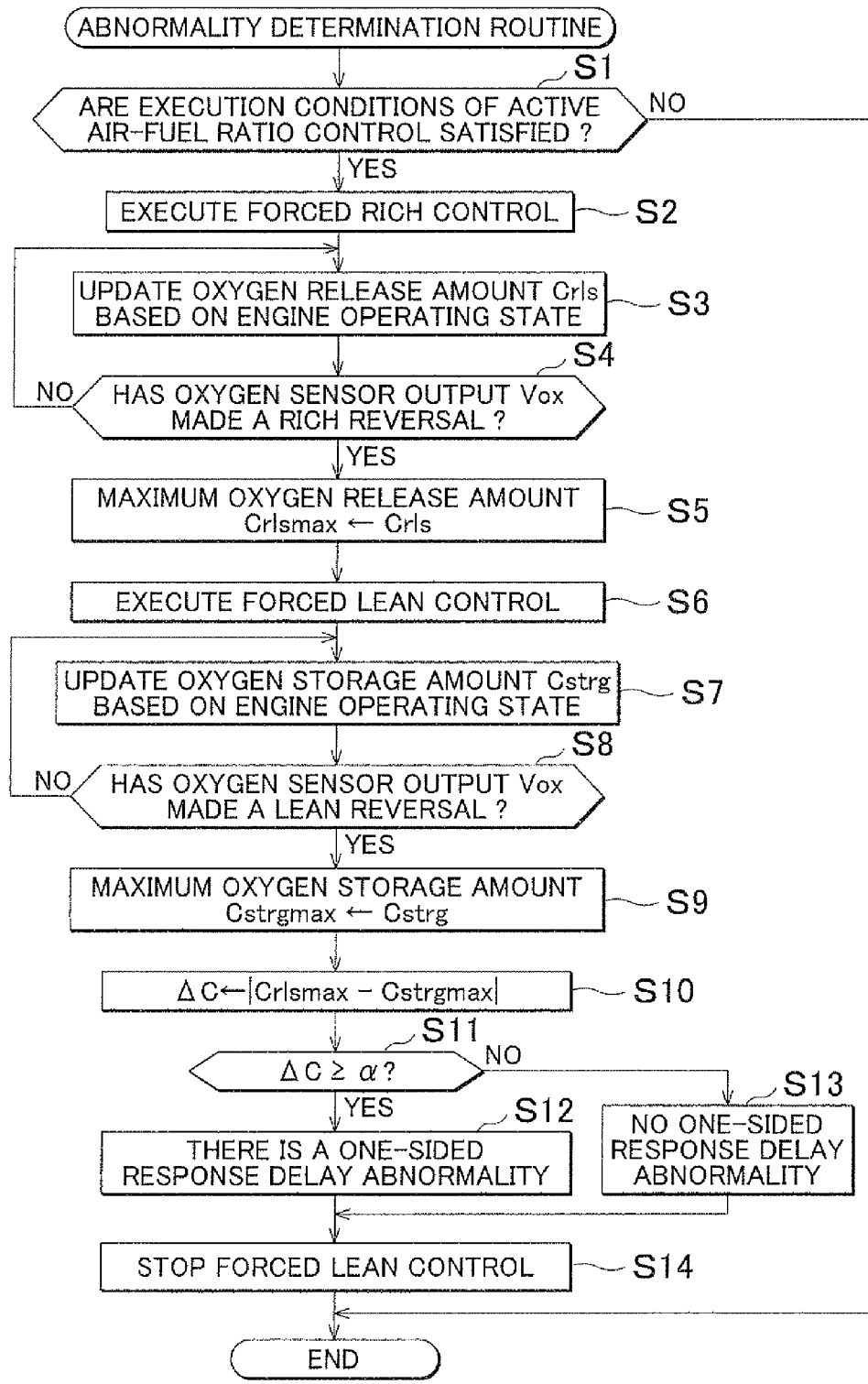

FUEL CUT CONTROL — STOP / EXECUTE

OUTPUT VOLTAGE Vaf OF AIR-FUEL RATIO SENSOR (LEAN / RICH), V1

OUTPUT VOLTAGE Vox OF OXYGEN SENSOR (RICH / LEAN), V2, tref, trich, τ, t31, t32, t33

TIMING t

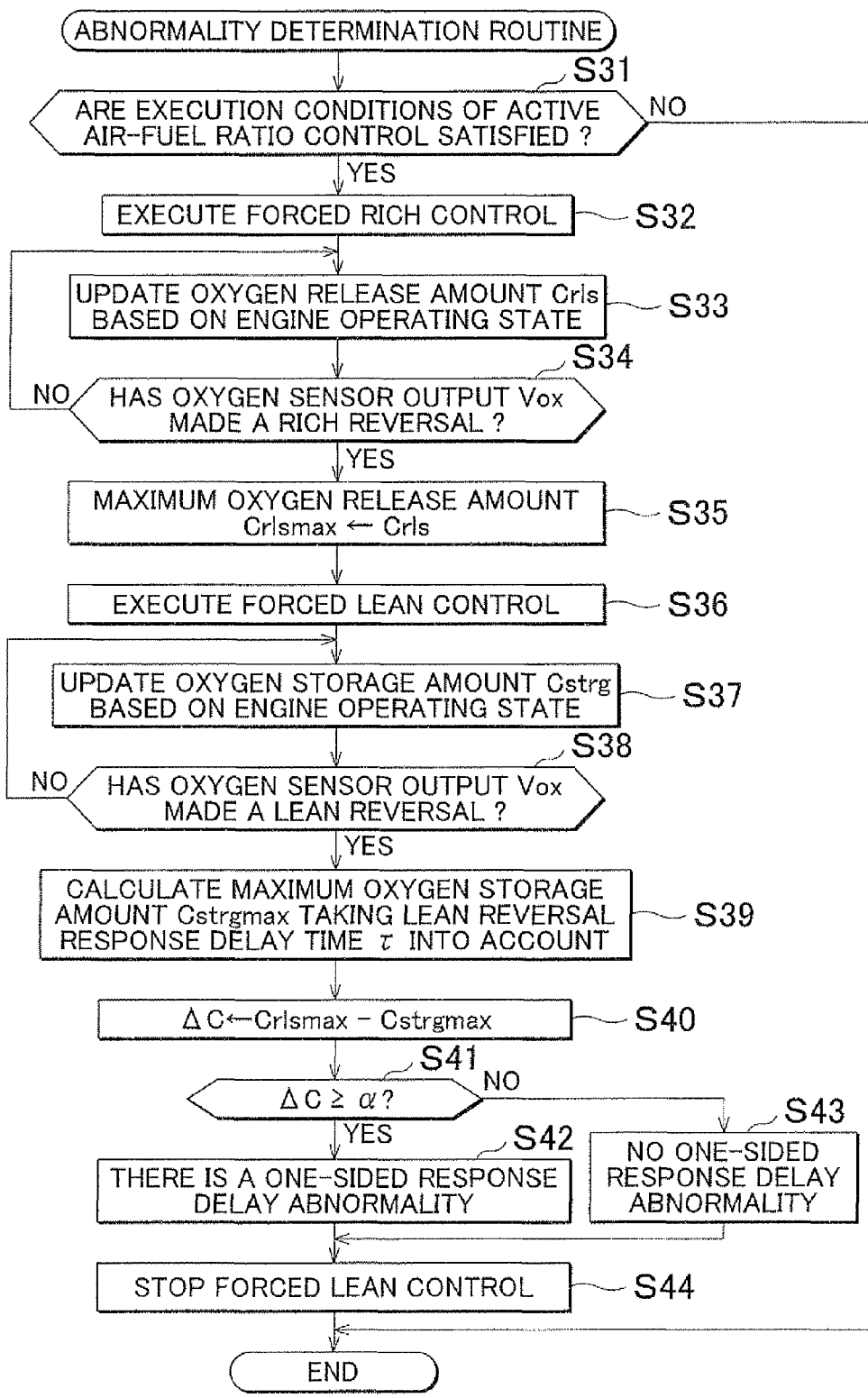

INTERNAL COMBUSTION ENGINE EXHAUST GAS CONTROL APPARATUS AND ABNORMALITY DETERMINING METHOD THEREOF

INCORPORATION BY REFERENCE

The disclosure of Japanese Patent Application No. 2010-062844 filed on Mar. 18, 2010 including the specification, drawings and abstract is incorporated herein by reference in its entirety.

BACKGROUND OF THE INVENTION

1. Field of the Invention

The invention relates to an exhaust gas control apparatus of an internal combustion engine, that includes a catalyst that is provided in an exhaust passage of an internal combustion engine and has the ability to store oxygen, and an oxygen sensor that is provided on the exhaust gas downstream side of the catalyst in the exhaust passage and outputs a signal indicative of an air-fuel ratio of exhaust gas. The invention also relates to a method for determining an abnormality in this exhaust gas control apparatus.

2. Description of the Related Art

An exhaust gas control apparatus of an internal combustion engine purifies carbon monoxide (CO), hydrocarbons (HC), and oxides of nitrogen (NOx) in exhaust gas by oxidizing the CO and HC and reducing the NOx using a catalyst provided in an exhaust passage. Here, when the catalyst atmosphere is a stoichiometric air-fuel ratio, the purifying reactions (i.e., the oxidation-reduction reactions) of the HC, CO, and NOx can be performed simultaneously. However, when the catalyst atmosphere is different than the stoichiometric air-fuel ratio, the purifying reactions of the HC, CO, and NOx are not able to be performed simultaneously. Therefore, as described in Japanese Patent Application Publication No. 2007-154749 (JP-A-2007-154749), for example, a decrease in exhaust gas purifying efficiency due to deviation of the air-fuel ratio such as that described above is suppressed by compensating for the excess or deficiency of oxygen that occurs due to the temporary deviation of the air-fuel ratio, by providing a catalyst capable of storing oxygen in the exhaust passage.

In such an exhaust gas control catalyst, an air-fuel ratio sensor that outputs a signal proportionate to the air-fuel ratio of the exhaust gas is provided on the exhaust gas upstream side of the catalyst in the exhaust passage. Also, an oxygen sensor that outputs a signal indicative of the air-fuel ratio of the exhaust gas, or more specifically, that outputs approximately 0 V when the air-fuel ratio of the exhaust gas is leaner than the stoichiometric air-fuel ratio and outputs approximately 1 V when the air-fuel ratio of the exhaust gas is richer than the stoichiometric air-fuel ratio, is provided on the exhaust gas downstream side of the catalyst.

Incidentally, the ability of the catalyst to store oxygen (i.e., the oxygen storage capacity) decreases due to degradation and the like of the catalyst. Therefore, the ability of the catalyst to store oxygen, i.e., the degree of degradation of the catalyst, is ascertained by estimating the maximum oxygen storage amount of the catalyst. More specifically, the catalyst is made to release oxygen by forcibly making the air-fuel ratio of the exhaust gas that flows into the catalyst richer than the stoichiometric air-fuel ratio. Then when the catalyst is no longer able to release any more oxygen, the output of the oxygen sensor will make a rich reversal from 0 V to 1 V, i.e., will reverse to rich. When the output of the oxygen sensor makes a rich reversal, the catalyst is made to store oxygen by forcibly making the air-fuel ratio of the exhaust gas that flows into the catalyst leaner than the stoichiometric air-fuel ratio. Then when no more oxygen is able to be stored in the catalyst, the output of the oxygen sensor will make a lean reversal from 1 V to 0 V, i.e., will reverse to lean. Here, the maximum oxygen storage amount of the catalyst corresponds to the amount of oxygen that flows into the catalyst during a period of time from when the output of the oxygen sensor makes a rich reversal until the output of the oxygen sensor makes a lean reversal. Therefore, the amount of oxygen that flows into the catalyst per unit of time can be estimated based on the operating state of the engine, and the maximum oxygen storage amount can be estimated by integrating this oxygen amount over this period of time. Also, the maximum oxygen release amount of the catalyst corresponds to the amount of oxygen released from the catalyst during a period of time from when the output of the oxygen sensor makes a lean reversal until the output of the oxygen sensor makes a rich reversal. Therefore, the amount of oxygen released from the catalyst per unit of time can be estimated based on the operating state of the engine, and the maximum oxygen release amount can be estimated by integrating this oxygen amount over this period of time.

Incidentally, a response delay in the rich reversal or the lean reversal of the output of the oxygen sensor may occur for some reason. In this case, the output of the oxygen sensor makes a rich reversal later than the timing at which the actual air-fuel ratio of the exhaust gas near the oxygen sensor reverses from leaner than the stoichiometric air-fuel ratio to richer than the stoichiometric air-fuel ratio. Also, the output of the oxygen sensor makes a lean reversal later than the timing at which the actual air-fuel ratio of the exhaust gas near the oxygen sensor reverses from richer than the stoichiometric air-fuel ratio to leaner than the stoichiometric air-fuel ratio. Therefore, the maximum oxygen storage amount or the maximum oxygen release amount is no longer able to be accurately estimated. As a result, when making a determination as to whether there is an abnormality in the catalyst based on the maximum oxygen storage amount or the maximum oxygen release amount, this determination is not able to be made accurately.

SUMMARY OF THE INVENTION

In view of the foregoing problems, the invention thus provides an internal combustion engine exhaust gas control apparatus, and an abnormality determining method thereof, in which a response delay in one of a rich reversal or a lean reversal of the output of an oxygen sensor is able to be accurately ascertained, if such a response delay occurs.

Therefore, a first aspect of the invention relates to an exhaust gas control apparatus of an internal combustion engine. This exhaust gas control apparatus includes a catalyst that is provided in an exhaust passage of an internal combustion engine and is configured to store oxygen; an oxygen sensor that is provided on an exhaust gas downstream side of the catalyst in the exhaust passage and is configured to output a signal indicative of an air-fuel ratio of exhaust gas; a first estimating portion that is configured to estimate whether an amount of oxygen stored in the catalyst is a maximum amount or a minimum amount; a second estimating portion that is configured to execute forced rich control that forcibly makes an air-fuel ratio of exhaust gas that flows into the catalyst richer than a stoichiometric air-fuel ratio when it is estimated by the first estimating portion that the amount of oxygen stored in the catalyst is the maximum amount, and to estimate an amount of oxygen released from the catalyst during a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio, based on the period of time; a third estimating portion that is configured to execute forced lean control that forcibly makes an air-fuel ratio of exhaust gas that flows into the catalyst leaner than the stoichiometric air-fuel ratio when it is estimated by the first estimating portion that the amount of oxygen stored in the catalyst is the minimum amount, and to estimate an amount of oxygen stored in the catalyst during a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio, based on the period of time; and a determining portion that is configured to determine that there is a response delay abnormality in one of the rich reversal or the lean reversal of the output of the oxygen sensor when a degree of deviation between the oxygen release amount estimated by the second estimating portion and the oxygen storage amount estimated by the third estimating portion is equal to or greater than a predetermined degree.

Another aspect of the invention relates to a method for determining an abnormality in an exhaust gas control apparatus of an internal combustion engine. This abnormality determining method includes estimating whether an amount of oxygen stored in a catalyst that is included in an exhaust gas control apparatus of an internal combustion engine, is provided in an exhaust passage of the internal combustion engine, and is capable of storing oxygen is a maximum amount or a minimum amount according to output of an oxygen sensor that is included in the exhaust gas control apparatus of the internal combustion engine and provided on an exhaust gas downstream side of the catalyst in the exhaust passage; executing forced rich control that forcibly makes an air-fuel ratio of exhaust gas that flows into the catalyst richer than a stoichiometric air-fuel ratio, when it is estimated that the amount of oxygen stored in the catalyst is the maximum amount; estimating an amount of oxygen released from the catalyst during a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio, based on the period of time; executing forced lean control that forcibly makes an air-fuel ratio of exhaust gas flowing into the catalyst leaner than the stoichiometric air-fuel ratio, when it is estimated that the amount of oxygen stored in the catalyst is the minimum amount; estimating an amount of oxygen stored in the catalyst during a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio, based on the period of time; and determining that there is a response delay abnormality in one of the rich reversal or the lean reversal of the output of the oxygen sensor when a degree of deviation between the estimated oxygen release amount and the estimated oxygen storage amount is equal to or greater than a predetermined degree.

If forced rich control that forcibly makes the air-fuel ratio of exhaust gas that flows into the catalyst richer than the stoichiometric air-fuel ratio is executed when the amount of oxygen stored in the catalyst is the maximum amount, oxygen will be released from the catalyst. Then when the catalyst is no longer able to release any more oxygen, the air-fuel ratio of the exhaust gas that flows into the catalyst becomes richer than the stoichiometric air-fuel ratio so the output of the oxygen sensor makes a rich reversal. However, if there is a response delay in the rich reversal of the output of the oxygen sensor, the output of the oxygen sensor will make the rich reversal at a timing that is later than the timing at which the catalyst actually becomes no longer able to release oxygen. Therefore, if the amount of oxygen released from the catalyst during the period of time from when the forced rich control starts until the output of the oxygen sensor makes the rich reversal is estimated based on this period of time, the oxygen release amount will be a value that is larger than the amount of oxygen that is actually released.

Also, if forced lean control that forcibly makes the air-fuel ratio of exhaust gas that flows into the catalyst leaner than the stoichiometric air-fuel ratio is executed when the amount of oxygen stored in the catalyst is the minimum amount, oxygen will be stored in the catalyst. Then when the catalyst is no longer able to store any more oxygen, the air-fuel ratio of the exhaust gas that flows into the catalyst becomes leaner than the stoichiometric air-fuel ratio so the output of the oxygen sensor makes a lean reversal. However, if there is a response delay in the lean reversal of the output of the oxygen sensor, the output of the oxygen sensor will make the lean reversal at a timing that is later than the timing at which the catalyst actually becomes no longer able to store oxygen. Therefore, if the amount of oxygen stored in the catalyst during the period from when the forced lean control starts until the output of the oxygen sensor makes the lean reversal is estimated based on this period of time, the oxygen storage amount will be a value that is larger than the amount of oxygen that is actually stored.

Accordingly, if there is a response delay in one of the rich reversal or the lean reversal of the output of the oxygen sensor, one of the estimated oxygen release amount or the estimated oxygen storage amount will be calculated as a value that is larger than the other. Therefore, according to the structure described above, it can be accurately ascertained that there is a response delay in one of the rich reversal or the lean reversal of the output of the oxygen sensor if it is determined that there is a response delay abnormality in one of the rich reversal or the lean reversal of the output of the oxygen sensor when the degree of deviation between the estimated oxygen release amount and the estimated oxygen storage amount is equal to or greater than a predetermined value.

Also, in the exhaust gas control apparatus described above, the second estimating portion may estimate an amount of oxygen released from the catalyst per unit time based on an engine operating state, during the period of time between the point in time at which the forced rich control starts and the point in time at which the output of the oxygen sensor makes a rich reversal, and estimate the oxygen release amount by integrating the estimated released oxygen amount over the period of time. Further, the third estimating portion may estimate an amount of oxygen stored in the catalyst per unit time based on the engine operating state, during the period of time between the point in time at which the forced lean control starts and the point in time at which the output of the oxygen sensor makes a lean reversal, and estimate the oxygen storage amount by integrating the estimated stored oxygen amount over the period of time. As a result, the oxygen release amount and the oxygen storage amount are able to be accurately estimated.

Also, in the exhaust gas control apparatus described above, the first estimating portion may estimate that the amount of oxygen stored in the catalyst is the maximum amount when the oxygen sensor continues to output a value corresponding to an air-fuel ratio that is leaner than the stoichiometric air-fuel ratio for a predetermined period of time.

When the oxygen sensor continues to output a value corresponding to an air-fuel ratio that is leaner than the stoichiometric air-fuel ratio for a predetermined period of time, the amount of oxygen stored in the catalyst is the maximum amount. Accordingly, with the structure described above, it is possible to easily and accurately estimate that the amount of oxygen stored in the catalyst is the maximum amount. Incidentally, a predetermined period of time may be set through simulation or testing using the oxygen sensor and the catalyst.

Also, in the exhaust gas control apparatus of an internal combustion engine described above, the first estimating portion may estimate that the amount of oxygen stored in the catalyst is the minimum amount when the output of the oxygen sensor makes a rich reversal.

According to this structure, it is possible to easily estimate that the amount of oxygen stored in the catalyst is the minimum amount. Also, the oxygen release amount and the oxygen storage amount may be set in the following manner, for example. That is, when the oxygen sensor continues to output a value corresponding to an air-fuel ratio that is leaner than the stoichiometric air-fuel ratio for a predetermined period of time, the amount of oxygen stored in the catalyst is determined to be the maximum amount, and the oxygen release amount starts to be estimated. The oxygen release amount continues to be estimated until the output of the oxygen sensor makes a rich reversal. Then when the output of the oxygen sensor makes a rich reversal, the amount of oxygen stored in the catalyst is determined to be the minimum amount, and the oxygen storage amount starts to be estimated. The oxygen storage amount continues to be estimated until the output of the oxygen sensor makes a lean reversal. Alternately estimating the oxygen release amount and estimating the oxygen storage amount in this way makes it possible to shorten the time that it takes to estimate the total oxygen release amount and the total oxygen storage amount.

Further, the exhaust gas control apparatus of an internal combustion engine described above may also include a fourth estimating portion that is configured to perform fuel cut control that stops fuel injection in the internal combustion engine when it is estimated by the first estimating portion that the amount of oxygen stored in the catalyst is the minimum amount, and to estimate a response delay time of a lean reversal of the output of the oxygen sensor based on a period of time between a point in time at which the fuel cut control starts and a point in time at which the output of the oxygen sensor makes a lean reversal. Also, the third estimating portion may take the response delay time of the lean reversal of the output of the oxygen sensor estimated by the fourth estimating portion into account when estimating the oxygen storage amount.

In the structure in which it is determined that there is a response delay abnormality in one of the rich reversal or the lean reversal of the output of the oxygen sensor based on the degree of deviation between the oxygen release amount estimated by the second estimating portion and the oxygen storage amount estimated by the third estimating portion, if one of the rich reversal or the lean reversal of the output of the oxygen sensor is normal, it is possible to accurately determine a response delay abnormality for the other. However, if there is a response delay abnormality of a similar degree in both the rich reversal and the lean reversal of the output of the oxygen sensor, there is no significant difference between the oxygen release amount estimated by the second estimating portion and the oxygen storage amount estimated by the third estimating portion, so it is not possible to accurately ascertain such a response delay abnormality.

Regarding this, with the structure described above, if a delay abnormality occurs in the lean reversal of the output of the oxygen sensor, it is able to be accurately ascertained by estimating the response delay time of the lean reversal of the oxygen sensor while fuel cut control is being executed. Also, by taking the response delay time into account when estimating the oxygen storage amount prior to making the abnormality determination of the oxygen sensor, it is possible to precisely estimate the oxygen storage amount even if there is a response delay abnormality in the lean reversal of the output of the oxygen sensor. Thus, even if there is a response delay abnormality of a similar degree in both the rich reversal and the lean reversal of the output of the oxygen sensor, it is able to be accurately ascertained.

Incidentally, when the oxygen sensor continues to output a value corresponding to an air-fuel ratio that is richer than the stoichiometric air-fuel ratio for a predetermined period of time, the amount of oxygen stored in the catalyst may be estimated to be the minimum amount by the first estimating portion.

Still another aspect of the invention relates to an exhaust gas control apparatus of an internal combustion engine. This exhaust gas control apparatus includes a catalyst that is provided in an exhaust passage of an internal combustion engine and is configured to store oxygen; an oxygen sensor that is provided on an exhaust gas downstream side of the catalyst in the exhaust passage and is configured to output a signal indicative of an air-fuel ratio of exhaust gas; an estimating portion that is configured to estimate whether an amount of oxygen stored in the catalyst is a maximum amount or a minimum amount; a first measuring portion that is configured to control an amount of oxygen released from the catalyst per unit time to a predetermined amount while forced rich control that forcibly makes an air-fuel ratio of exhaust gas that flows into the catalyst richer than a stoichiometric air-fuel ratio is being executed, when it is estimated by the estimating portion that the amount of oxygen stored in the catalyst is the maximum amount, and to measure a lean continuation time that is a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio; a second measuring portion that is configured to control an amount of oxygen stored in the catalyst per unit time to a predetermined amount while forced lean control that forcibly makes an air-fuel ratio of exhaust gas that flows into the catalyst leaner than the stoichiometric air-fuel ratio is being executed, when it is estimated by the estimating portion that the amount of oxygen stored in the catalyst is the minimum amount, and to measure a rich continuation time that is a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio; and a determining portion that is configured to determine that there is a response delay abnormality in one of the rich reversal or the lean reversal of the output of the oxygen sensor when a degree of deviation between the lean continuation time measured by the first measuring portion and the rich continuation time measured by the second measuring portion is equal to or greater than a predetermined degree.

Yet another aspect of the invention relates to a method for determining an abnormality in an exhaust gas control apparatus of an internal combustion engine. This abnormality determining method includes estimating whether an amount of oxygen stored in a catalyst that is included in an exhaust gas control apparatus of an internal combustion engine, is provided in an exhaust passage of the internal combustion engine, and is capable of storing oxygen is a maximum amount or a minimum amount according to output of an oxygen sensor that is included in the exhaust gas control apparatus of the internal combustion engine and provided on an exhaust gas downstream side of the catalyst in the exhaust passage; controlling an amount of oxygen released from the catalyst per unit time to a predetermined amount while forced rich control that forcibly makes an air-fuel ratio of exhaust gas that flows into the catalyst richer than a stoichiometric air-fuel ratio is being executed, when it is estimated that the amount of oxygen stored in the catalyst is the maximum amount, and measuring a lean continuation time that is a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio; controlling an amount of oxygen stored in the catalyst per unit time to a predetermined amount while forced lean control that forcibly makes an air-fuel ratio of exhaust gas that flows into the catalyst leaner than the stoichiometric air-fuel ratio is being executed, when it is estimated that the amount of oxygen stored in the catalyst is the minimum amount, and measuring a rich continuation time that is a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio; and determining that there is a response delay abnormality in one of the rich reversal or the lean reversal of the output of the oxygen sensor when a degree of deviation between the measured lean continuation time and the measured rich continuation time is equal to or greater than a predetermined degree.

The measured lean continuation time may be regarded as the oxygen release amount of the catalyst by controlling a target air-fuel ratio such that the amount of oxygen released from the catalyst per unit time becomes constant while the forced rich control is being executed. Also, the measured rich continuation time may be regarded as the oxygen storage amount of the catalyst by controlling a target air-fuel ratio such that the amount of oxygen stored in the catalyst per unit time becomes constant while the forced lean control is being executed. Thus, according to the exhaust gas control apparatus and the abnormality determining method thereof described above, it is possible accurately ascertain that there is a response delay in one of the rich reversal or the lean reversal of the output of the oxygen sensor, similar to the oxygen control apparatus and the abnormality determining method thereof that determine a response delay abnormality in an oxygen sensor by estimating the oxygen release amount and the oxygen storage amount described above.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6A is a timing chart showing a change in the output voltage of the air-fuel ratio sensor to illustrate a principle of the abnormality determination according to the first example embodiment;

FIG. 6B is a timing chart showing a change in the output voltage of the oxygen sensor to illustrate a principle of the abnormality determination according to the first example embodiment;

FIG. 6C is a timing chart showing a change in the amount of oxygen released from the catalyst to illustrate a principle of the abnormality determination according to the first example embodiment;

FIG. 6D is a timing chart showing a change in the amount of oxygen stored in the catalyst to illustrate a principle of the abnormality determination according to the first example embodiment;

FIG. 7 is a flowchart illustrating an abnormality determination routine according to the first example embodiment;

FIG. 10 is a flowchart illustrating an abnormality determination routine according to the second example embodiment.

DETAILED DESCRIPTION OF EMBODIMENTS

Hereinafter, a first example embodiment in which an exhaust gas control apparatus of an internal combustion engine of the invention is embodied as an exhaust gas control apparatus for port injection type gasoline engine (hereinafter, referred to as "internal combustion engine 1") that is mounted in a vehicle will be described in detail with reference to FIGS. 1 to 7.

Figure 1:
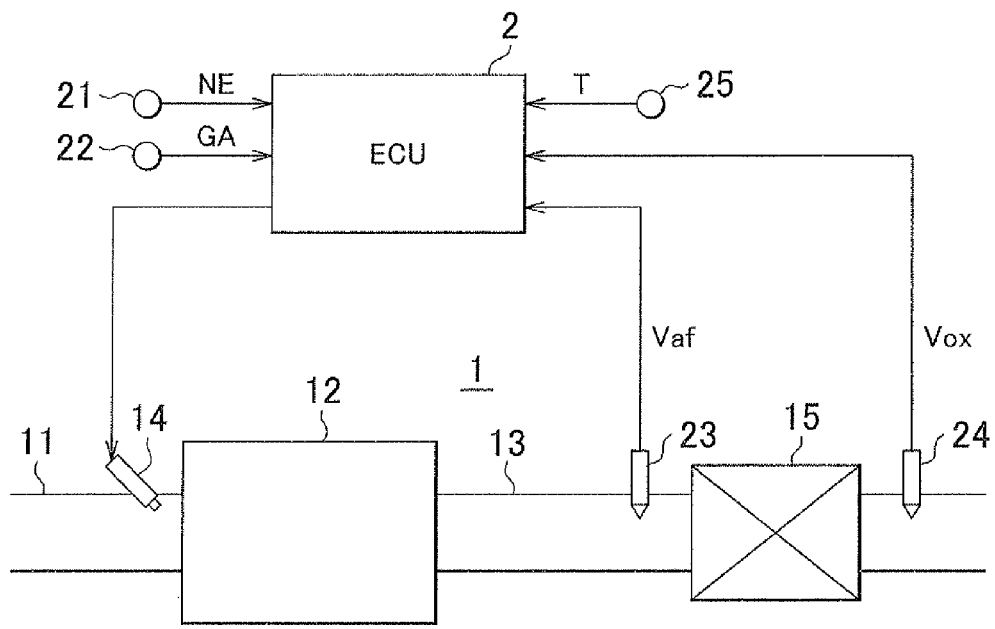
FIG. 1 is a schematic diagram of the general configuration of an internal combustion engine and an electronic control unit that controls the internal combustion engine, with regards to an exhaust gas control apparatus of an internal combustion engine according to a first example embodiment of the invention.

FIG. 1 is a schematic diagram of the general configuration of the internal combustion engine 1 and an electronic control unit (ECU) 2 that controls the internal combustion engine 1. As shown in FIG. 1, the internal combustion engine 1 includes an intake passage 11, a combustion chamber 12, and an exhaust passage 13. The intake passage 11 is a passage that supplies air to the combustion chamber 12. Also, a fuel injection valve 14 that injects fuel into an intake port of the intake passage 11 is provided in the intake passage 11. Air supplied through a throttle valve in the intake passage 11 mixes with fuel injected from the fuel injection valve 14 to form an air-fuel mixture, which is then supplied to the combustion chamber 12. In the combustion chamber 12, the air-fuel mixture is compressed by a piston. The compressed air-fuel mixture is spark-ignited by a spark plug and combusts as a result. The expansion energy generated by the combustion turns a crankshaft that serves as an output shaft of the internal combustion engine 1.

Also, exhaust gas generated during combustion is discharged outside through the exhaust passage 13. A catalyst 15 that is able to store oxygen is provided in the exhaust passage 13. This catalyst 15 purifies carbon monoxide (CO), hydrocarbons (HC), and oxides of nitrogen (NOx) in the exhaust gas by oxidizing the CO and HC, and reducing the NOx. Also, the catalyst 15 stores oxygen in the exhaust gas when the air-fuel ratio of the exhaust gas flowing into the catalyst 15 is leaner than the stoichiometric air-fuel ratio, and releases oxygen that it has stored when the air-fuel ratio of the exhaust gas flowing into the catalyst 15 is richer than the stoichiometric air-fuel ratio. Therefore, even if the atmosphere of the catalyst 15 deviates from the stoichiometric air-fuel ratio, purifying reactions of HC, CO, and NOx can be performed simultaneously. It is to be understood that "storage" used herein means retention of a substance (solid, liquid, gas molecules) in the form of at least one of adsorption, adhesion, absorption, trapping, occlusion, and others.

Various controls of this internal combustion engine 1 are performed by the ECU 2. The ECU 2 includes a central processing unit (CPU), read-only memory (ROM), random access memory (RAM), and an input/output port (I/O). Here, the CPU executes various calculations related to the various controls of the internal combustion engine 1. Programs and data used in the various controls are stored in the ROM. Also, detection results of various sensors provided in various parts of the internal combustion engine 1 and the calculation results of the CPU are temporarily stored in the RAM. The I/O mediates the input and output of signals between the ECU 2 and external devices.

Information such as the detection results from sensors provided in various parts of the internal combustion engine 1 and the operation state of switches and the like is input to the ECU 2. More specifically, an engine speed sensor 21 that detects the engine speed NE that is the rotation speed of the crankshaft, and an intake air amount sensor 22 that detects the amount of air (i.e., the intake air amount) G supplied to the combustion chamber 12 through the throttle valve are provided. Further, an air-fuel ratio sensor 23 that detects the air-fuel ratio of exhaust gas that flows into the catalyst 15, and an oxygen sensor 24 that detects the oxygen concentration of exhaust gas that flows out of the catalyst 15 are provided.

Also, a catalyst temperature sensor 25 that detects the temperature T of the catalyst 15 is provided. Incidentally, in this example embodiment, as the catalyst temperature sensor 25, a structure that directly detects the temperature T of the catalyst 15 is employed. However, the structure employed to detect the temperature T of the catalyst 15 is not limited to this. That is, an exhaust gas temperature sensor that detects the temperature of exhaust gas on the exhaust gas downstream side of the catalyst 15 may be provided, and the temperature T of the catalyst 15 may be estimated based on the detection results of this exhaust gas temperature sensor.

Figure 2:
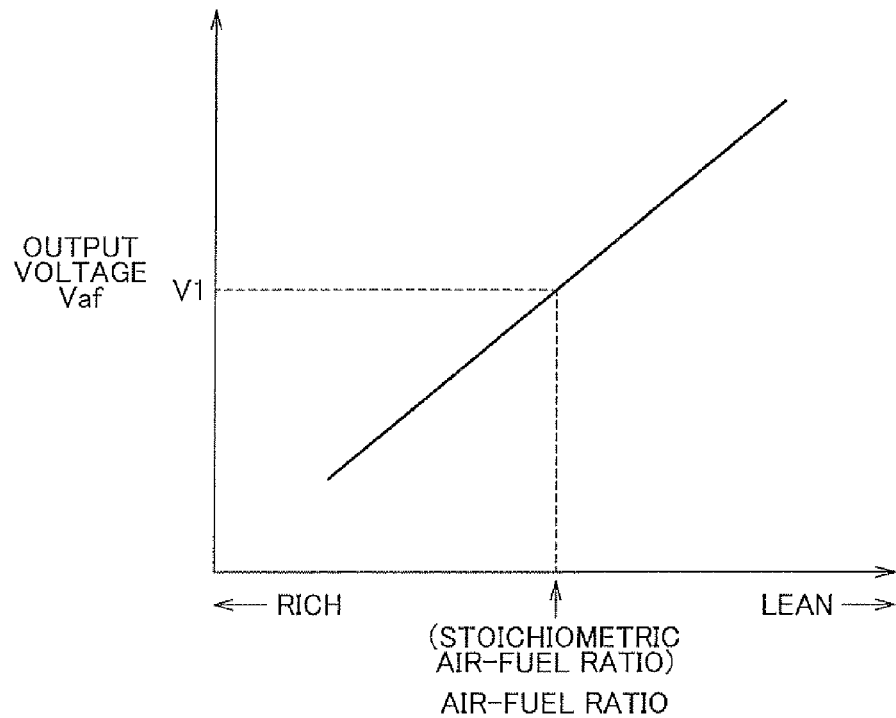
FIG. 2 is a graph of an output characteristic of an air-fuel ratio sensor used in the exhaust gas control apparatus of this example embodiment.

Also, various other sensors aside from these are provided as necessary. Here, the output characteristics of the air-fuel ratio sensor 23 and the oxygen sensor 24 will be described with reference to FIGS. 2 and 3. Incidentally, FIG. 2 is a view of the relationship between the actual air-fuel ratio and an output voltage Vaf of the air-fuel ratio sensor 23. Also, FIG. 3 is a view of the relationship between the actual air-fuel ratio and an output voltage Vox of the oxygen sensor 24.

As shown in FIG. 2, the air-fuel ratio sensor 23 outputs an output voltage Vaf that is proportionate to the actual air-fuel ratio. The air-fuel ratio sensor 23 outputs a larger output voltage Vaf as the air-fuel ratio increases, i.e., as the air-fuel ratio becomes leaner. Incidentally, the air-fuel ratio sensor 23 outputs a voltage V1 when the air-fuel ratio is the stoichiometric air-fuel ratio.

Figure 3:
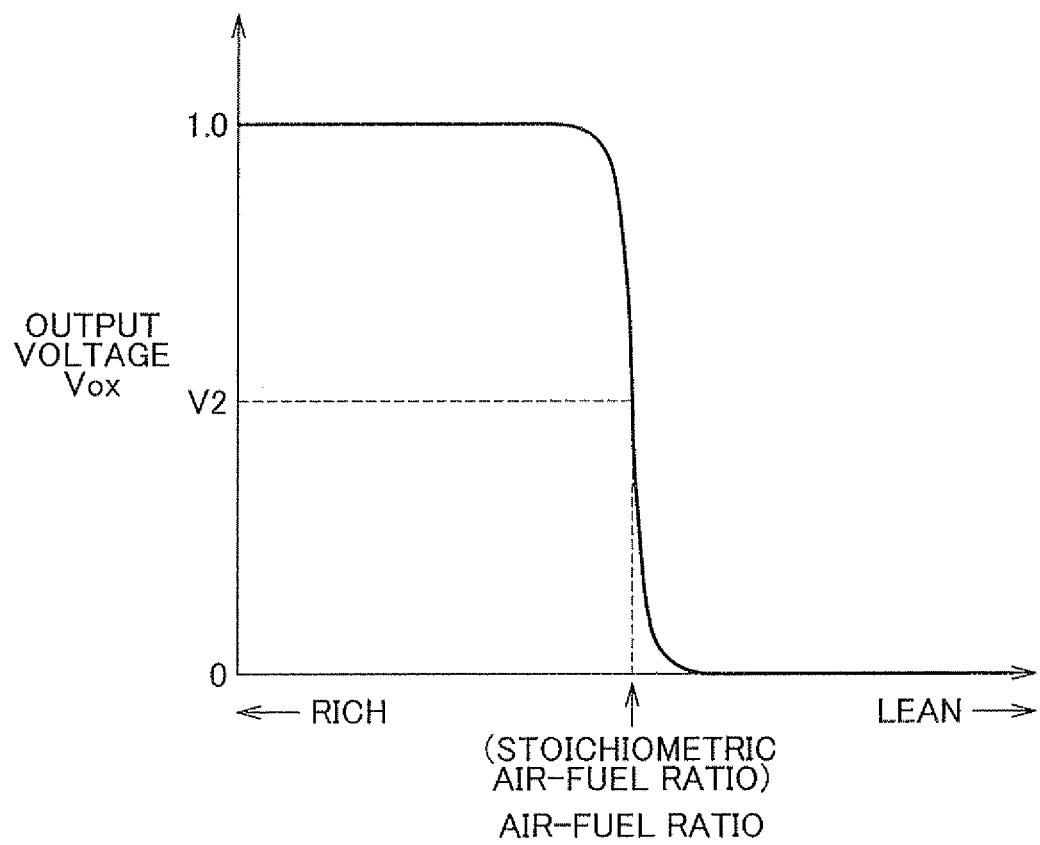
FIG. 3 is a graph of an output characteristic of an oxygen sensor used in the exhaust gas control apparatus of this example embodiment.

As shown in FIG. 3, the oxygen sensor 24 outputs an output voltage Vox indicative of the actual air-fuel ratio. The oxygen sensor 24 outputs an output voltage Vox of approximately 1 V when the air-fuel ratio is richer than the stoichiometric air-fuel ratio, and outputs an output voltage Vox of approximately 0 V when the air-fuel ratio is leaner than the stoichiometric air-fuel ratio. Also, the output voltage Vox abruptly changes when the actual air-fuel ratio changes from rich to lean (or from lean to rich) across the stoichiometric air-fuel ratio. That is, the oxygen sensor 24 outputs a voltage V2 that is between 0 V and 1 V when the actual air-fuel ratio is the stoichiometric air-fuel ratio.

The ECU 2 executes the following controls, for example, based on the engine operating state and the like ascertained by the detection results of various sensors such as the sensors 21 to 25 described above. That is, the ECU 2 calculates a fuel injection quantity Q based on the engine speed NE and the intake air amount GA and the like, and executes fuel injection control that controls the fuel injection valve 14 according to the fuel injection quantity Q.

Also, the ECU 2 estimates the air-fuel ratio of the air-fuel mixture based on the detection result from the air-fuel ratio sensor 23, and executes air-fuel ratio feedback control that calculates an air-fuel ratio correction value for the fuel injection quantity Q, such that the estimated air-fuel ratio will match a target air-fuel ratio, and increase or decrease corrects the fuel injection quantity.

Incidentally, the ability of the catalyst 15 to store oxygen, i.e., the oxygen storage capacity of the catalyst 15, decreases due to degradation and the like of the catalyst 15. Therefore, the oxygen storage capacity of the catalyst 15, i.e., the degree of degradation of the catalyst, is ascertained by estimating a maximum oxygen storage amount of the catalyst 15.

More specifically, the ECU 2 executes active air-fuel ratio control that will be described next, and estimates a maximum oxygen release amount Crlsmax and a maximum oxygen storage amount Cstrgmax of the catalyst 15 while this control is being executed. With this active air-fuel ratio control, forced rich control that forcibly makes the air-fuel ratio of the exhaust gas that flows into the catalyst 15 richer than the stoichiometric air-fuel ratio and forced lean control that forcibly makes the air-fuel ratio of the exhaust gas that flows into the catalyst 15 leaner than the stoichiometric air-fuel ratio are alternately performed by controlling the air-fuel ratio of the air-fuel mixture.

Figure 4A:
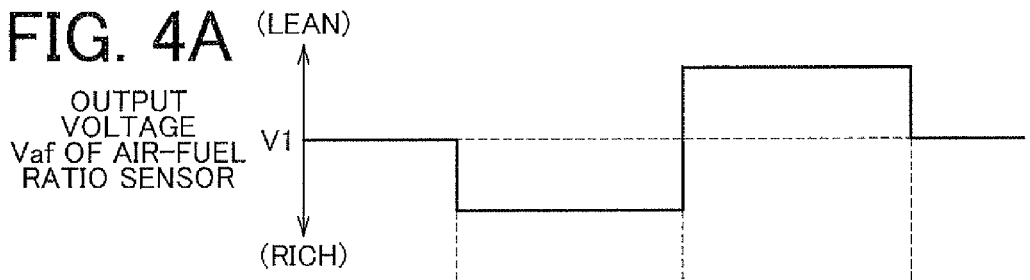
FIG. 4A is a timing chart showing a change in the output voltage of the air-fuel ratio sensor while active air-fuel ratio control is being executed.
Figure 4B:
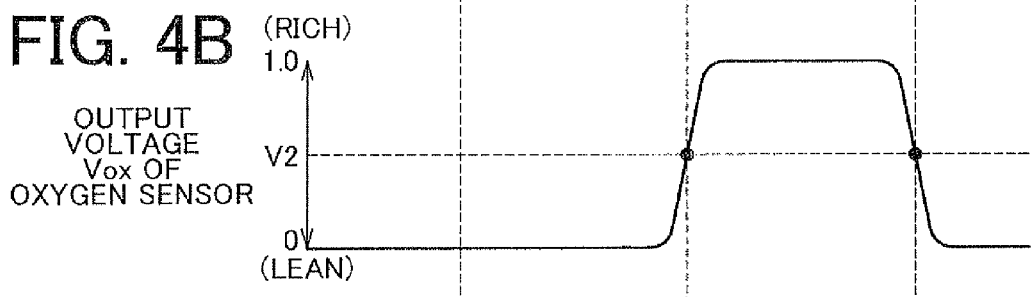
FIG. 4B is a timing chart showing a change in the output voltage of the oxygen sensor while active air-fuel ratio control is being executed.
Figure 4C:
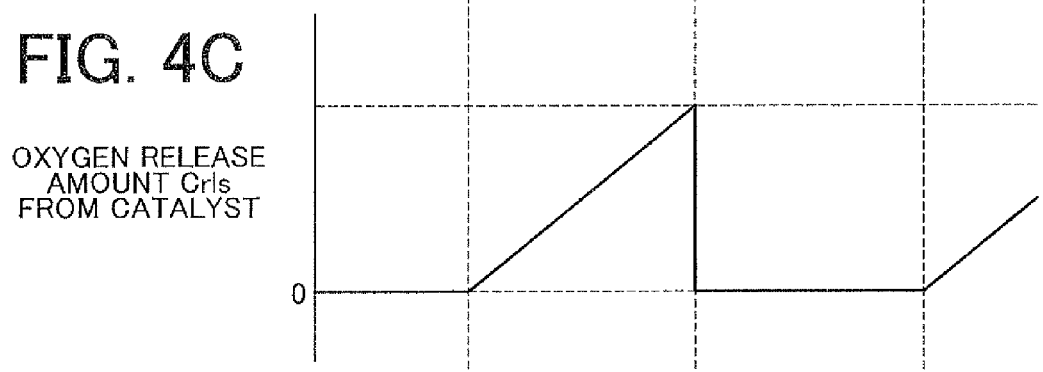
FIG. 4C is a timing chart showing a change in the amount of oxygen released from a catalyst while active air-fuel ratio control is being executed.
Figure 4D:
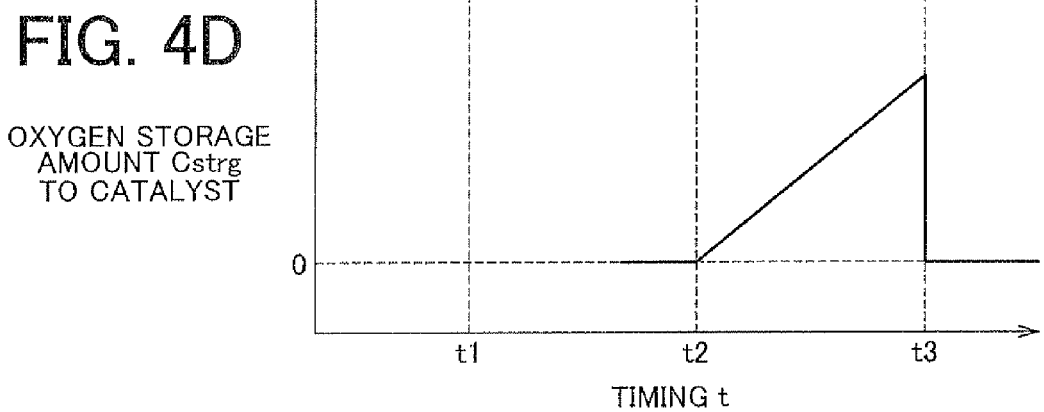
FIG. 4D is a timing chart showing a change in the amount of oxygen stored in the catalyst while active air-fuel ratio control is being executed.

Here, the manner in which active air-fuel ratio control is executed and the manners in which the maximum oxygen release amount Crlsmax and the maximum oxygen storage amount Cstrgmax are estimated will be described with reference to FIGS. 4A to 4D. Incidentally, FIG. 4A is a view of the change in the output voltage Vaf of the air-fuel ratio sensor 23 while active air-fuel ratio control is being executed, FIG. 4B is a view of the change in the output voltage Vox of the oxygen sensor 24 while active air-fuel ratio control is being executed, and FIG. 4C is a timing chart that shows the change in the oxygen release amount Crls of the catalyst 15 while active air-fuel ratio control is being executed, and FIG. 4D is a timing chart that shows the change in the oxygen storage amount Cstrg of the catalyst 15 while active air-fuel ratio control is being executed. Also, in the example shown in FIGS. 4A to 4D, it is assumed that the oxygen sensor 24 is functioning normally and there is no response delay in either the rich reversal or the lean reversal of the output of the oxygen sensor 24.

As shown in FIGS. 4A to 4D, for more than a predetermined period of time until timing t1, a target air-fuel ratio is set as the stoichiometric air-fuel ratio and the output voltage Vaf of the air-fuel ratio sensor 23 outputs a value V1 indicative of the stoichiometric air-fuel ratio (FIG. 4A). Also, for more than a predetermined period of time before timing t1, the oxygen sensor 24 outputs a value (0 V) indicative of an air-fuel ratio that is leaner than the stoichiometric air-fuel ratio (FIG. 4B). Here, it is assumed that the amount of oxygen stored in the catalyst 15 is the maximum amount when the oxygen sensor 24 continues to output 0 V for a predetermined period of time. Incidentally, the predetermined period of time is a value that takes into account the oxygen storage characteristic of the catalyst 15, and is set in advance through testing or the like.

Here, at timing t1 when the target air-fuel ratio is forcibly made richer than the stoichiometric air-fuel ratio, the air-fuel ratio of the exhaust gas that flows into the catalyst 15 becomes richer than the stoichiometric air-fuel ratio, and oxygen stored in the catalyst 15 is released (FIG. 4C).

Then at timing t2 when all of the oxygen stored in the catalyst 15 has been released, such that the catalyst 15 is no longer able to release any more oxygen, the air-fuel ratio on the exhaust gas downstream side of the catalyst 15 changes from leaner than the stoichiometric air-fuel ratio to richer than the stoichiometric air-fuel ratio, and the output Vox of the oxygen sensor 24 makes a rich reversal from 0 V to 1 V (FIG. 4B). With this active air-fuel ratio control, the target air-fuel ratio is forcibly made leaner than the stoichiometric air-fuel ratio when the output Vox of the oxygen sensor 24 increases beyond a voltage V2. As a result, the air-fuel ratio of the exhaust gas that flows into the catalyst 15 becomes leaner than the stoichiometric air-fuel ratio, and oxygen is stored in the catalyst 15 (FIG. 4D). At this time, oxygen is not released from the catalyst 15 to the exhaust gas downstream side, so the air-fuel ratio on the exhaust gas downstream side of the catalyst 15 becomes richer than the stoichiometric air-fuel ratio and the output Vox of the oxygen sensor 24 becomes 1 V as a result (FIG. 4B).

At timing t3 when the catalyst 15 is no longer able to store any more oxygen, oxygen is released from the catalyst 15 to the exhaust gas downstream side (FIG. 4C), so the output Vox of the oxygen sensor 24 makes a lean reversal from 1 V to 0 V (FIG. 4B).

In this way, the amount of oxygen released from the catalyst 15 per unit time is estimated based on the engine operating state during the period of time (t1 to t2) between the point in time at which forced rich control starts and the point in time at which the output Vox of the oxygen sensor 24 makes a rich reversal, and the maximum oxygen release amount Crlsmax is estimated by integrating the estimated released oxygen amount over this period of time (t1 to t2).

Also, the amount of oxygen stored in the catalyst 15 per unit time is estimated based on the engine operating state during the period of time (t2 to t3) between the point in time at which forced lean control starts and the point in time at which the output Vox of the oxygen sensor 24 makes a lean reversal, and the maximum oxygen storage amount Cstrgmax is estimated by integrating the estimated stored oxygen amount over this period of time (t2 to t3).

Incidentally, the air-fuel ratio and the fuel injection quantity Q or the intake air amount GA at any given time are preferably used as the engine operating state for estimating the amount of oxygen released from the catalyst 15 per unit time and the amount of oxygen stored in the catalyst 15 per unit time.

However, a response delay in the rich reversal or the lean reversal of the output of the oxygen sensor 24 may occur for some reason. In this case, the output of the oxygen sensor 24 makes a rich reversal later than the timing at which the actual air-fuel ratio of the exhaust gas near the oxygen sensor 24 reverses from leaner than the stoichiometric air-fuel ratio to richer than the stoichiometric air-fuel ratio. Also, the output of the oxygen sensor 24 makes a lean reversal later than the timing at which the actual air-fuel ratio of the exhaust gas near the oxygen sensor 24 reverses from richer than the stoichiometric air-fuel ratio to leaner than the stoichiometric air-fuel ratio. Therefore, the maximum oxygen storage amount Cstrgmax or the maximum oxygen release amount Crlsmax is no longer able to be accurately estimated. As a result, when making a determination as to whether there is an abnormality in the catalyst 15 based on the maximum oxygen storage amount Cstrgmax or the maximum oxygen release amount Crlsmax, this determination is not able to be made accurately.

Therefore, in this example embodiment, the maximum oxygen release amount Crlsmax and the maximum oxygen storage amount Cstrgmax are estimated in the manner described above, and if the absolute value $\Delta C$ (=|Crlsmax−Cstrgmax|) of the difference between the maximum oxygen release amount Crlsmax and the maximum oxygen storage amount Cstrgmax is equal to or greater than a predetermined value $\alpha$, it is determined that there is a response delay abnormality (hereinafter, referred to as a "one-sided response delay abnormality") in one of the rich reversal or the lean reversal of the output Vox of the oxygen sensor 24.

Here, the principle of the abnormality determination for determining whether there is a one-sided response delay abnormality in the oxygen sensor 24 will be described with reference to FIGS. 5A to 5D and FIGS. 6A to 6D. Incidentally, FIGS. 5A to 5D and FIGS. 6A to 6D are timing charts corresponding to FIGS. 4A to 4D. In FIGS. 5A to 5D and FIGS. 6A to 6D, the solid lines show changes in the parameters when the oxygen sensor 24 is functioning normally. Also, in FIGS. 5A to 5D, the alternate long and short dash lines show changes in the parameters when there is a response delay abnormality in only the rich reversal of the output of the oxygen sensor 24. Also, in FIGS. 6A to 6D, the alternate long and short dash lines show changes in the parameters when there is a response delay abnormality in only the lean reversal of the output of the oxygen sensor 24.

As shown by the solid lines in FIGS. 5A to 5D and FIGS. 6A to 6D, when the oxygen sensor 24 is functioning normally, the maximum oxygen release amount C1 and the maximum oxygen storage amount C1 of the catalyst 15 are the same values. However, when there is a response delay in the rich reversal of the output of the oxygen sensor 24, the output Vox of the oxygen sensor 24 makes a rich reversal (FIG. 5B) at timing t13 that is later than timing t12 which is when the catalyst 15 actually becomes no longer able to release oxygen, as shown by the alternate long and short dash line in FIGS. 5A to 5D. Therefore, if the amount of oxygen released from the catalyst 15 during the period of time between the point in time at which forced rich control is executed and the point in time at which the output Vox of the oxygen sensor 24 makes a rich reversal (i.e., t11 to t13) (hereinafter this amount of oxygen will be referred to as the "maximum oxygen release amount") is estimated based on this period of time (i.e., t11 to t13), the maximum oxygen release amount C2 will be a value that is larger than the amount of oxygen C1 that is actually released (i.e., C2>C1).

Figure 5A:
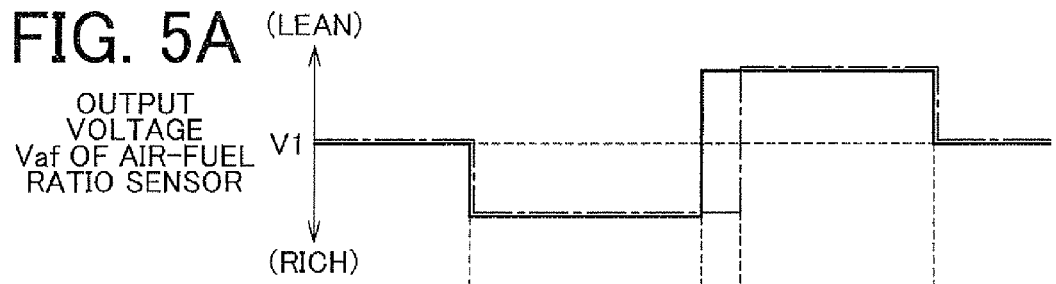
FIG. 5A is a timing chart showing a change in the output voltage of the air-fuel ratio sensor to illustrate a principle of an abnormality determination according to the first example embodiment.
Figure 5B:
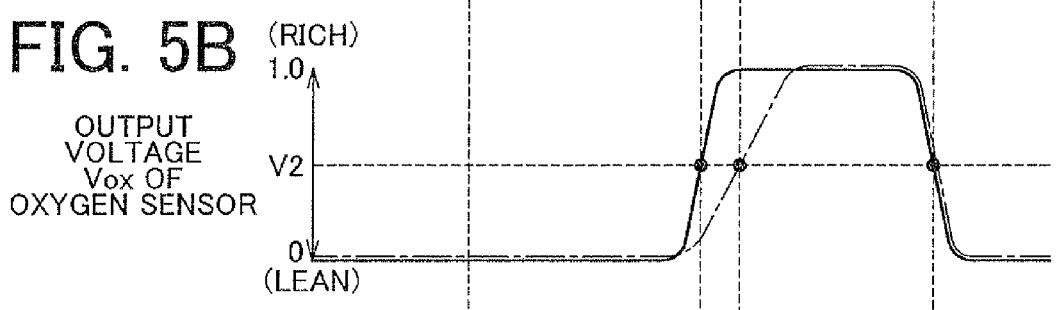
FIG. 5B is a timing chart showing a change in the output voltage of the oxygen sensor to illustrate a principle of the abnormality determination according to the first example embodiment.
Figure 5C:
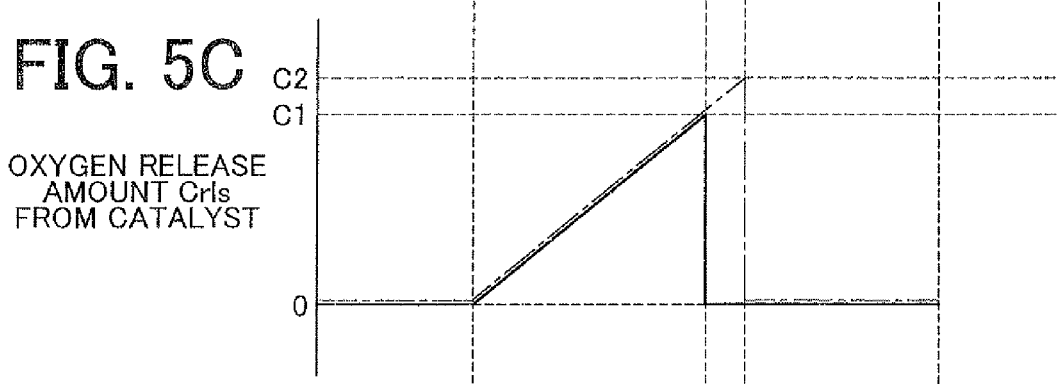
FIG. 5C is a timing chart showing a change in the amount of oxygen released from the catalyst to illustrate a principle of the abnormality determination according to the first example embodiment.
Figure 5D:
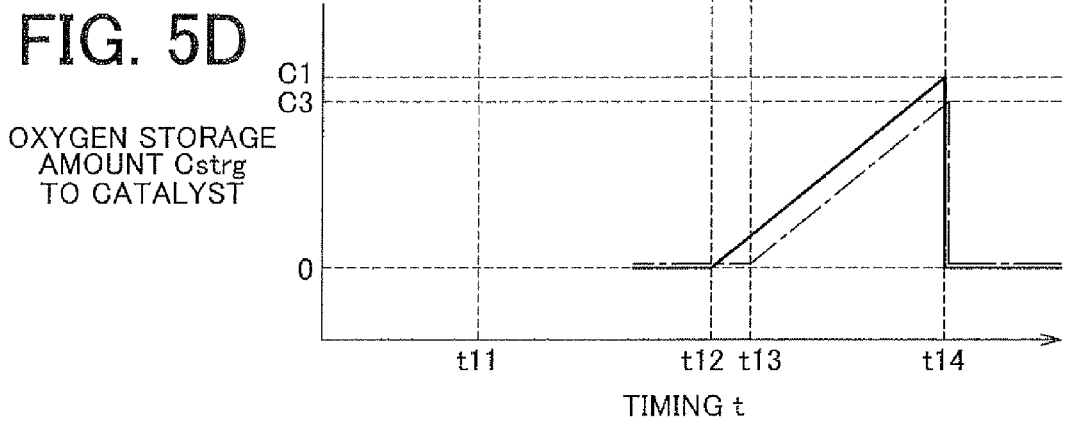
FIG. 5D is a timing chart showing a change in the amount of oxygen stored in the catalyst to illustrate a principle of the abnormality determination according to the first example embodiment.

Meanwhile, in this case, force lean control after the forced rich control starts from timing t13, which is when the rich reversal occurs, as shown by the alternate long and short dash lines in FIGS. 5A to 5D. However, because there is no response delay in the lean reversal of the output of the oxygen sensor 24, the output Vox of the oxygen sensor 24 makes a lean reversal at timing t14 which is when the catalyst 15 actually becomes no longer able to store oxygen (FIG. 5B). Therefore, if the amount of oxygen stored in the catalyst 15 during the period of time between the point in time at which forced lean control is executed and the point in time at which the output Vox of the oxygen sensor 24 makes a lean reversal (i.e., t13 to t14) (hereinafter this amount of oxygen will be referred to as the "maximum oxygen storage amount") is estimated based on this period of time (i.e., t13 to t14), the maximum oxygen storage amount C3 will be a value that is less than the amount of oxygen C1 that is actually stored (i.e., C3<C1).

That is, if there is a response delay in the rich reversal of the output of the oxygen sensor 24, the estimated maximum oxygen release amount C2 will be calculated as a value that is larger than the maximum oxygen storage amount C3 (i.e., C2>C3).

Next, a case in which there is a response delay in the lean reversal of the output of the oxygen sensor 24 will be described. As shown in FIGS. 6A to 6D, forced rich control starts from timing t21. Here, because there is no response delay in the rich reversal of the output of the oxygen sensor 24, the output Vox of the oxygen sensor 24 makes a rich reversal at timing t22 which is when the catalyst 15 actually becomes no longer able to release oxygen (FIG. 6B). Therefore, the maximum oxygen release amount C1 estimated when there is a response delay in the lean reversal of the output Vox of the oxygen sensor 24 becomes the same value as when the oxygen sensor 24 is functioning normally.

However, because there is a response delay in the lean reversal of the output of the oxygen sensor 24, the output Vox of the oxygen sensor 24 makes a lean reversal at timing t24 that is later than timing t23 which is when the catalyst 15 actually becomes no longer able to store oxygen, as shown by the alternate long and short dash lines in FIGS. 6A to 6D. Therefore, if the amount of oxygen stored in the catalyst 15 during the period of time between the point in time at which forced lean control is executed and the point in time at which the output Vox of the oxygen sensor 24 makes a lean reversal (i.e., t22 to t24) (hereinafter this amount of oxygen will be referred to as the "maximum oxygen storage amount") is estimated based on this period of time (i.e., t22 to t24), the maximum oxygen storage amount C4 will be a value that is larger than the amount of oxygen C1 that is actually stored (i.e., C4>C1).

That is, if there is a response delay in the lean reversal of the output Vox of the oxygen sensor 24, the estimated maximum oxygen storage amount C4 will be calculated as a value that is larger than the maximum oxygen storage amount C1 (i.e., C4>C1).

Accordingly, if there is a response delay in one of the rich reversal or the lean reversal of the output Vox of the oxygen sensor 24, one of the estimated maximum oxygen release amount Crlsmax or the estimated maximum oxygen storage amount Cstrgmax will be calculated as a value that is larger than the other. Therefore, as described above, it can be accurately ascertained that there is a one-sided response delay abnormality in the output Vox of the oxygen sensor 24 if it is determined that there is a one-sided response delay abnormality in the output Vox of the oxygen sensor 24 when the absolute value $\Delta C$ ($=|Crlsmax-Cstrgmax|$) of a difference between the estimated maximum oxygen release amount Crlsmax and the estimated maximum oxygen storage amount Cstrgmax is equal to or greater than the predetermined value $\alpha$. Incidentally, even when the degree of a one-sided response delay abnormality in the output Vox of the oxygen sensor 24 is small, the abnormality can be determined by setting the predetermined value $\alpha$ smaller. However, there is a certain degree of error in the estimated maximum oxygen release amount Crlsmax and the estimated maximum oxygen storage amount Cstrgmax due to noise in the detection results of the various sensors. Therefore, in this example embodiment, a predetermined value is set through testing or simulation as an appropriate value such that effects from such error will be eliminated.

Next, an abnormality determination routine for determining whether there is a one-sided response delay abnormality in the oxygen sensor 24 will be described with reference to FIG. 7. Incidentally, FIG. 7 is a flowchart of this abnormality determination routine. Also, the routine shown in this flowchart is repeatedly executed at predetermined intervals of time by the ECU 2 while the internal combustion engine 1 is operating.

As shown in FIG. 7, in this routine, the ECU 2 first determines in step S1 whether execution conditions of active air-fuel ratio control are satisfied. Here, one execution condition of active air-fuel ratio control may be that the temperature T of the catalyst 15 be equal to or greater than a predetermined temperature. Also, another execution condition may be that the oxygen sensor 24 continue to output 0 V for a predetermined period of time while active air-fuel ratio control is not being performed, i.e., that the amount of oxygen stored in the catalyst 15 be estimated to be the maximum amount. Incidentally, the predetermined temperature is preferably set as a temperature that is higher than the activation temperature of the catalyst 15.

If it is determined in step S1 that the execution conditions of the active air-fuel ratio control are not satisfied (i.e., NO in step S1), then it is determined that it is not time to execute the abnormality determination routine, so this cycle of the routine ends.

If, on the other hand, it is determined in step S1 that the execution conditions of the active air-fuel ratio control are satisfied (i.e., YES in step S1), then the process proceeds on to step S2 where forced rich control in the active air-fuel ratio control is executed. Then the process proceeds on to step S3 where the amount of oxygen released from the catalyst 15 per unit time is estimated based on the engine operating state at that time, and the oxygen release amount Crls is updated by adding this to the oxygen release amount Crls up to this point. Incidentally, the initial value of the oxygen release amount Crls is set at 0. Next, the process proceeds on to step S4 where it is determined whether the output Vox of the oxygen sensor 24 has made a rich reversal (step S4). Here, it is determined that the output Vox of the oxygen sensor 24 has made a rich reversal if the output Vox of the oxygen sensor 24 has become equal to or greater than a predetermined value V2 from less than the predetermined value V2. If it is determined in step S4 that the output Vox of the oxygen sensor 24 has not made a rich reversal (i.e., NO in step S4), then steps S3 and S4 are repeated, i.e., the oxygen release amount Crls is repeatedly updated, at predetermined intervals of time until the output Vox makes a rich reversal.

If, on the other hand, it is determined in step S4 that the output Vox of the oxygen sensor 24 has made a rich reversal (i.e., YES in step S4), then the process proceeds on to step S5 where the oxygen release amount Crls at that time is set as the maximum oxygen release amount Crlsmax. Then the process proceeds on to step S6 where forced lean control is executed. Next, the process proceeds on to step S7 where the amount of oxygen stored in the catalyst 15 per unit time is estimated based on the engine operating state at that time, and the oxygen storage amount Cstrg is updated by adding this to the oxygen storage amount Cstrg up to this point. Incidentally, the initial value of the oxygen storage amount Cstrg is set at 0. Next, the process proceeds on to step S8 where it is determined whether the output Vox of the oxygen sensor 24 has made a lean reversal (step S8). Here, it is determined that the output Vox of the oxygen sensor 24 has made a lean reversal if the output Vox of the oxygen sensor 24 has become less than the predetermined value V2 from equal to or greater than the predetermined value V2. If it is determined in step S8 that the output Vox of the oxygen sensor 24 has not made a lean reversal (i.e., NO in step S8), then steps S7 and S8 are repeated, i.e., the oxygen storage amount Cstrg is repeatedly updated, at predetermined intervals of time until the output Vox makes a lean reversal.

If, on the other hand, it is determined in step S8 that the output Vox of the oxygen sensor 24 has made a lean reversal (i.e., YES in step S8), then the process proceeds on to step S9 where the oxygen storage amount Cstrg at that time is set as the maximum oxygen storage amount Cstrgmax. Then the process proceeds on to step S10 where the absolute value $\Delta C$ (=|Crlsmax−Cstrgmax|) of a difference between the maximum oxygen release amount Crlsmax set in step S5 and the maximum oxygen storage amount Cstrgmax set in step S9 is calculated. Then the process proceeds to step S11 where it is determined whether the absolute value $\Delta C$ of this difference is equal to or greater than a predetermined value $\alpha$. If the absolute value $\Delta C$ of this difference is equal to or greater than the predetermined value $\alpha$ (i.e., YES in step S11), then it is determined that there is a one-sided response delay abnormality in the output of the oxygen sensor 24 (step S12). If, on the other hand, the absolute value $\Delta C$ of this difference is less than the predetermined value $\alpha$ (i.e., NO in step S11), then it is determined that there is not a one-sided response delay abnormality in the output of the oxygen sensor 24 (step S13). Once a determination is made in this way, the process proceeds on to step S14 where forced lean control is stopped, after which this cycle of the routine ends.

Incidentally, in this example embodiment, the ECU 2 is an example of a first estimating portion, a second estimating portion, a third estimating portion, and a determining portion of the invention. The following operation and effects are able to be obtained by the exhaust gas control apparatus of an internal combustion engine according to the example embodiment described above.

(1) The exhaust gas control apparatus of the internal combustion engine 1 includes the catalyst 15 that is provided in the exhaust passage 13 of the internal combustion engine 1 and has the ability to store oxygen, and the oxygen sensor 24 that is provided on the exhaust gas downstream side of the catalyst 15 in the exhaust passage 13 and outputs a signal indicative of the air-fuel ratio of the exhaust gas. The ECU 2 estimates the amount of oxygen C stored in the catalyst 15. Also, when the amount of oxygen C stored in the catalyst 15 is estimated to be the maximum amount, the ECU 2 executes forced rich control to forcibly make the air-fuel ratio of the exhaust gas that flows into the catalyst 15 richer than the stoichiometric air-fuel ratio, and estimates the amount of oxygen released from the catalyst 15 (i.e., the maximum oxygen release amount Crlsmax) during the period of time between the point in time at which the forced rich control starts and the point in time at which the output Vox of the oxygen sensor 24 makes a rich reversal from a value (0 V) corresponding to an air-fuel ratio that is leaner than the stoichiometric air-fuel ratio to a value (1 V) corresponding to an air-fuel ratio that is richer than the stoichiometric air-fuel ratio, based on this period of time. Also, when the amount of oxygen C stored in the catalyst 15 is estimated to be the minimum amount, the ECU 2 executes forced lean control to forcibly make the air-fuel ratio of the exhaust gas that flows into the catalyst 15 leaner than the stoichiometric air-fuel ratio, and estimates the amount of oxygen stored in the catalyst 15 (i.e., the maximum oxygen storage amount Cstrgmax) during the period of time between the point in time at which the forced lean control starts and the point in time at which the output Vox of the oxygen sensor 24 makes a lean reversal from a value (1 V) corresponding to an air-fuel ratio that is richer than the stoichiometric air-fuel ratio to a value (0 V) corresponding to an air-fuel ratio that is leaner than the stoichiometric air-fuel ratio, based on this period of time. Also, if the absolute value $\Delta C$ (=|Crlsmax−Cstrgmax|) of the difference between the maximum oxygen release amount Crlsmax and the maximum oxygen storage amount Cstrgmax is equal to or greater than the predetermined value $\alpha$, it is determined that there is a response delay abnormality in one of the rich reversal or the lean reversal of the output Vox of the oxygen sensor 24. As a result, it is possible to accurately ascertain that there is a response delay in one of the rich reversal or the lean reversal of the output Vox of the oxygen sensor 24.

(2) The ECU 2 estimates the amount of oxygen released from the catalyst 15 per unit time based on the engine operating state during the period of time between the point in time at which the forced rich control starts and the point in time at which the output Vox of the oxygen sensor 24 makes a rich reversal, and estimates the maximum oxygen release amount Crlsmax by integrating this over this period of time. Also, the ECU 2 estimates the amount of oxygen stored in the catalyst 15 per unit time based on the engine operating state during the period of time between the point in time at which the forced lean control starts and the point in time at which the output Vox of the oxygen sensor 24 makes a lean reversal, and estimates the maximum oxygen storage amount Cstrgmax by integrating this over this period of time. As a result, it is possible to accurately estimate the maximum oxygen release amount Crlsmax and the maximum oxygen storage amount Cstrgmax.

(3) The ECU 2 estimates the amount of oxygen stored in the catalyst 15 to be the maximum amount when the oxygen sensor 24 continues to output a value (0 V) corresponding to an air-fuel ratio that is leaner than the stoichiometric air-fuel ratio for a predetermined period of time. When the oxygen sensor 24 continues to output a value (0 V) corresponding to an air-fuel ratio that is leaner than the stoichiometric air-fuel ratio for a predetermined period of time, the amount of oxygen stored in the catalyst 15 is the maximum amount. Accordingly, with this example embodiment, it is possible to easily and accurately estimate that the amount of oxygen stored in the catalyst 15 is the maximum amount.

(4) The ECU 2 estimates that the amount of oxygen stored in the catalyst 15 is the minimum amount when the output Vox of the oxygen sensor 24 makes a rich reversal. As a result, it is possible to easily estimate that the amount of oxygen stored in the catalyst 15 is the minimum amount.

(5) When the oxygen sensor 24 continues to output a value (0 V) corresponding to an air-fuel ratio that is leaner than the stoichiometric air-fuel ratio for a predetermined period of time, the ECU 2 determines that the amount of oxygen stored in the catalyst 15 is the maximum amount and starts to estimate the oxygen release amount. The ECU 2 continues to estimate the oxygen release amount until the output Vox of the oxygen sensor 24 makes a rich reversal. Then when the output Vox of the oxygen sensor 24 makes a rich reversal, the ECU 2 determines that the amount of oxygen stored in the catalyst 15 is the minimum amount and starts to estimate the oxygen storage amount. The ECU 2 continues to estimate the oxygen storage amount until the output Vox of the oxygen sensor 24 makes a lean reversal. Alternately estimating the maximum oxygen release amount Crlsmax and estimating the maximum oxygen storage amount Cstrgmax in this way makes it possible to shorten the time that it takes to estimate the total maximum oxygen release amount Crlsmax and the total maximum oxygen storage amount Cstrgmax.

Hereinafter, a second example embodiment of the exhaust gas control apparatus of an internal combustion engine of the invention will be described in detail.

In the first example embodiment described above, it is determined that there is a response delay abnormality in one of the rich reversal or the lean reversal of the output Vox of the oxygen sensor 24 when the absolute value $\Delta C$ of a difference between the maximum oxygen release amount Crlsmax and the maximum oxygen storage amount Cstrgmax is equal to or greater than the predetermined value $\alpha$. According to this determination method, if one of the rich reversal or the lean reversal of the output of the oxygen sensor 24 is normal, it is possible to accurately determine a response delay abnormality for the other. However, if there is a response delay abnormality of a similar degree in both the rich reversal and the lean reversal of the output of the oxygen sensor 24, there is no significant difference between the maximum oxygen release amount Crlsmax and the maximum oxygen storage amount Cstrgmax, so it is not possible to accurately ascertain such a response delay abnormality.

Therefore, in this example embodiment, when it is estimated that the amount of oxygen stored in the catalyst 15 is the minimum amount, the ECU 2 performs fuel cut control that stops fuel injection in the internal combustion engine 1, and estimates a response delay time of the lean reversal of the oxygen sensor 24 based on a period of time between a point in time at which the fuel cut control starts and a point in time at which the output Vox of the oxygen sensor 24 makes a lean reversal. As a result, if a delay abnormality occurs in the lean reversal of the output of the oxygen sensor 24, it is able to be accurately ascertained.

Also, the response delay time $\tau$ is taken into account when estimating the maximum oxygen storage amount Cstrgmax prior to making the abnormality determination of the oxygen sensor 24. As a result, it is possible to precisely estimate the maximum oxygen storage amount Cstrgmax even if there is a response delay abnormality in the lean reversal of the output of the oxygen sensor 24. Thus, even if there is a response delay abnormality of a similar degree in both the rich reversal and the lean reversal of the output of the oxygen sensor 24, this is accurately ascertained.

Figure 8A:
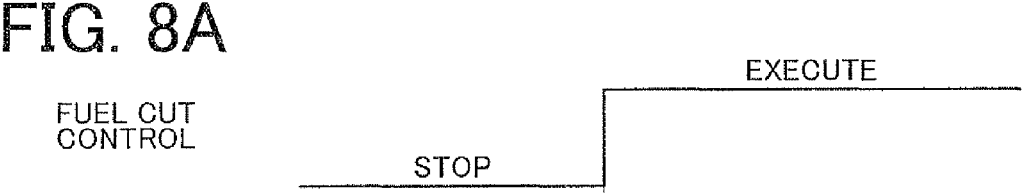
FIG. 8A is a timing chart showing a change in the execution state of fuel cut control to illustrate the manner in which a response delay time is estimated according to a second example embodiment of the invention.
Figure 8B:
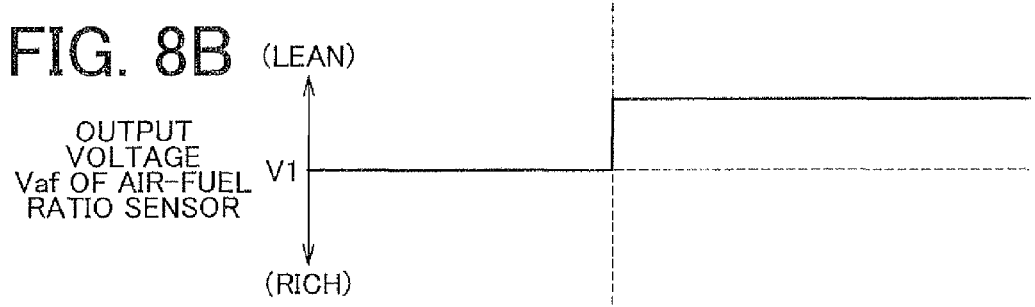
FIG. 8B is a timing chart showing a change in the output voltage of an air-fuel ratio sensor to illustrate the manner in which the response delay time is estimated according to the second example embodiment of the invention.
Figure 8C:
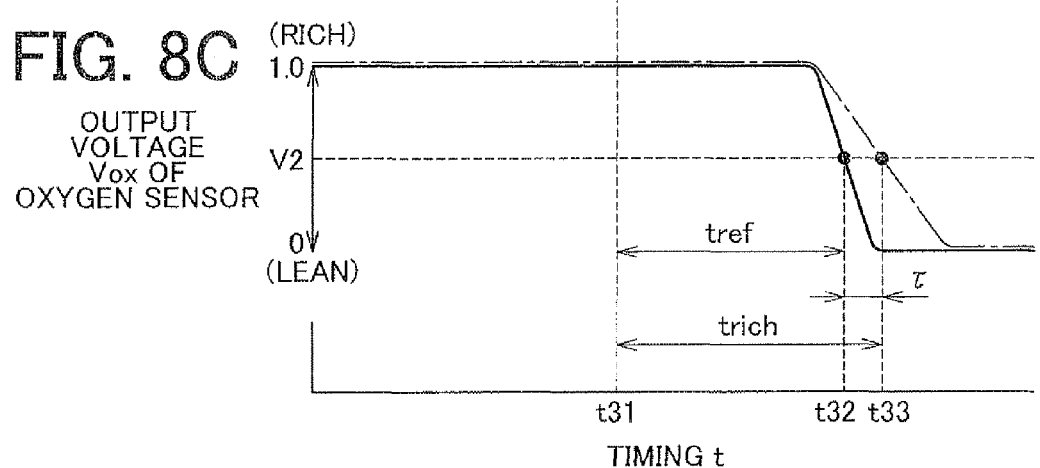
FIG. 8C is a timing chart showing a change in the output voltage of an oxygen sensor to illustrate the manner in which the response delay time is estimated according to the second example embodiment of the invention.

Here, the manner in which the response delay time of the lean reversal of the output of the oxygen sensor 24 is estimated will be described with reference to FIGS. 8A to 8C. Incidentally, FIG. 8A is a timing chart showing a change in the execution state of fuel cut control, FIG. 8B is a timing chart showing a change in the output voltage Vaf of the air-fuel ratio sensor 23, and FIG. 8C is a timing chart showing a change in the output voltage Vox of the oxygen sensor 24. Also, in the examples shown in FIGS. 8A to 8C, the solid lines show a case in which the oxygen sensor 24 is functioning normally, and the alternate long and short dash lines show a case in which there is a response delay abnormality in the lean reversal of the output of the oxygen sensor 24.

First, as shown in FIGS. 8A to 8C, at timing t31 when the oxygen sensor 24 continues to output a value (1 V) corresponding to an air-fuel ratio that is richer than the stoichiometric air-fuel ratio for a predetermined period of time, the amount of oxygen stored in the catalyst 15 can be estimated as the minimum amount. At this timing t31, fuel cut control starts and fuel injection in the internal combustion engine 1 stops (FIG. 8A). As a result, after timing t31, intake air supplied through the intake passage 11 from outside the internal combustion engine 1 flows as it is into the exhaust passage 13, so the air-fuel ratio sensor 23 outputs a value corresponding to an air-fuel ratio that is leaner than the stoichiometric air-fuel ratio (FIG. 8B). Also, the air-fuel ratio of the exhaust gas that flows into the catalyst 15, i.e., the air-fuel ratio of the intake air, becomes leaner than the stoichiometric air-fuel ratio, so the catalyst 15 stores oxygen. Then at timing t32 when the catalyst 15 is no longer able to store any more oxygen, the oxygen sensor 24, when functioning normally, makes a lean reversal at this timing t32 (FIG. 8C), as shown by the solid lines in FIGS. 8A to 8C. However, if there is a response delay in the lean reversal of the output of the oxygen sensor 24, then the oxygen sensor 24 makes a lean reversal at timing t33 (FIG. 8C) that is later than the timing t32, as shown by the alternate long and short dash lines in FIGS. 8A to 8C. That is, the response delay time $\tau$ of the lean reversal of the oxygen sensor 24 can be estimated by subtracting the time between the start of the fuel cut control and the lean reversal of the output of the oxygen sensor 24 when the oxygen sensor 24 is functioning normally (hereinafter, this time will be referred to as the "reference time tref" (=t32−t31)), from the time between the start of the fuel cut control until the lean reversal of the output of the oxygen sensor 24 (hereinafter, this time will be referred to as the "rich time trich" (=t33−t31)).

Figure 9:
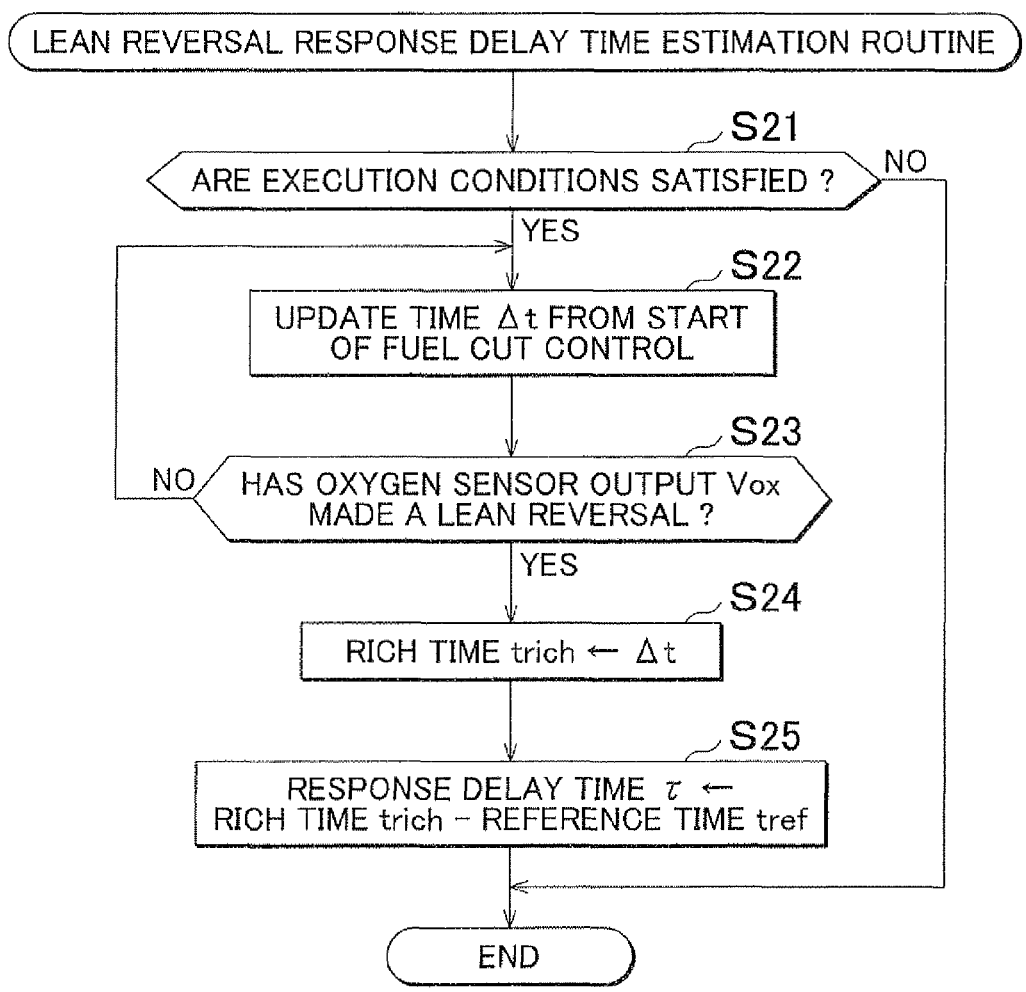
FIG. 9 is a flowchart illustrating a response delay time estimation routine according to the second example embodiment.

Next, a routine for estimating the response delay time τ of the lean reversal of the oxygen sensor 24 will be described with reference to FIG. 9. Incidentally, FIG. 9 is a flowchart illustrating the routine for estimating the response delay time τ of the lean reversal of the oxygen sensor 24. Also, the routine shown in this flowchart is repeatedly executed at predetermined intervals of time by the ECU 2 while the internal combustion engine 1 is operating.

As shown in FIG. 9, in this routine, the ECU 2 first determines whether execution conditions for estimating the response delay time τ are satisfied in step S21. Here, one execution condition for estimating the response delay time τ may be that the temperature T of the catalyst 15 be equal to or higher than a predetermined temperature. Also, another execution condition may be that the oxygen sensor 24 continue to output 0 V for a predetermined period of time while active air-fuel ratio control is not being performed, i.e., that the amount of oxygen stored in the catalyst 15 be estimated to be the minimum amount. Still another execution condition may be that fuel cut control be being executed. Incidentally, the predetermined temperature is preferably set as a temperature that is higher than the activation temperature of the catalyst 15.

If it is determined in step S21 that the execution conditions for estimating the response delay time τ are not satisfied (i.e., NO in step S21), then it is determined that it is not time to execute this estimation routine, so this cycle of the routine ends.

If, on the other hand, the execution conditions to estimate the response delay time τ are satisfied (i.e., YES in step S21), then the process proceeds on to step S22 where the time Δt from the start of the fuel cut control is updated. Then the process proceeds on to step S23 where it is determined whether the output Vox of the oxygen sensor 24 has made a lean reversal. If it is determined in step S23 that the output Vox of the oxygen sensor 24 has not made a lean reversal (i.e., NO in step S23), then steps S22 and S23 are repeated, i.e., the time Δt from the start of the fuel cut control is repeatedly updated, at predetermined intervals of time until the output Vox of the oxygen sensor 24 makes a lean reversal.

If it is determined in step S23 that the output Vox of the oxygen sensor 24 has made a lean reversal (i.e., YES in step S23), then the process proceeds on to step S24 where the time Δt that time is set as the rich time trich. Then the process proceeds on to step S25 where the response delay time τ of the lean reversal of the oxygen sensor 24 is calculated by subtracting the reference time tref from the rich time trich set in step S24, after which this cycle of the routine ends.

Here, a value that has been set in advance through simulation or testing using the oxygen sensor 24 and the catalyst 15 is used as the reference time tref. However, with this reference time tref, it is preferable to estimate the degree of degradation of the catalyst 15 by a known method from the oxygen storage capacity of the catalyst 15, i.e., from a change according to the degree of degradation, and then regularly update the reference rime tref based on the estimation result.

Next, an abnormality determination routine for determining whether there is a one-sided response delay abnormality in the oxygen sensor 24 will be described with reference to FIG. 10. Incidentally, FIG. 10 is a flowchart illustrating this abnormality determination routine. Also, the routine shown in this flowchart is repeatedly executed at predetermined intervals of time by the ECU 2 while the internal combustion engine 1 is operating.

Hereinafter, the differences with respect to the first example embodiment described above will be described. That is, as shown in FIG. 10, in this example embodiment, steps (i.e., steps S31 to S38 and steps S40 to S44) other than step S39 that are the same as the corresponding steps (i.e., steps S1 to S8 and steps S10 to S14) in the flowchart shown in FIG. 7 described above are performed.

In step S39, the response delay time τ of the lean reversal of the output of the oxygen sensor 24 described with reference to FIGS. 8A to 8C and 9 is taken into account when estimating the maximum oxygen storage amount Cstrgmax. More specifically, instead of setting the oxygen storage amount Cstrg when the output of the oxygen sensor 24 actually makes a lean reverse as the maximum oxygen storage amount Cstrgmax, the amount obtained from subtracting i) the amount of oxygen stored in the catalyst 15 during a period of time between a timing that is the response delay time τ before the timing at which the output of the oxygen sensor 24 makes a lean reversal and the timing at which the lean reversal is made, from ii) the oxygen storage amount Cstrg is set as the maximum oxygen storage amount Cstrgmax. As a result, the maximum oxygen storage amount Cstrgmax is inhibited from being estimated to be too large due to the response delay time of the lean reversal of the output of the oxygen sensor 24.

Incidentally, in this example embodiment, the ECU 2 is an example of a fourth estimating portion of the invention. The following operation and effects, in addition to the operation and effects (1) to (5) of the first example embodiment described above, are able to be obtained by the exhaust gas control apparatus of an internal combustion engine according to the example embodiment described above.

(6) When the oxygen sensor 24 continues to output a value (1 V) corresponding to an air-fuel ratio that is richer than the stoichiometric air-fuel ratio for a predetermined period of time, the ECU 2 performs fuel cut control that stops fuel injection in the internal combustion engine 1, and estimates the response delay time τ of the lean reversal of the oxygen sensor 24 based on the period of time between the point in time at which the fuel cut control starts and the point in time at which the output Vox of the oxygen sensor 24 makes a lean reversal. Also, this response delay time τ is also taken into account when estimating the maximum oxygen storage amount Cstrgmax. As a result, if there is a response delay abnormality of a similar degree in both the rich reversal and the lean reversal of the output of the oxygen sensor 24, this is able to be accurately ascertained.

Hereinafter, a third example embodiment of the exhaust gas control apparatus of an internal combustion engine of the invention will be described in detail.

In the first and second example embodiments described above, the maximum oxygen release amount Crlsmax and the maximum oxygen storage amount Cstrgmax of the catalyst 15 are estimated, and a response delay abnormality in one of the rich reversal or the lean reversal of the output Vox of the oxygen sensor 24 is determined based on the absolute value ΔC of a difference between the maximum oxygen release amount Crlsmax and the maximum oxygen storage amount Cstrgmax.

In contrast, in this example embodiment, instead of estimating the maximum oxygen release amount Crlsmax and the maximum oxygen storage amount Cstrgmax of the catalyst 15, the amount of oxygen released from the catalyst 15 per unit time is controlled to a predetermined amount while forced rich control is being executed, and the time from the start of the forced rich control until a rich reversal of the output Vox of the oxygen sensor 24 (hereinafter referred to as the "lean continuation time Δtlean") is measured.

Also, the amount of oxygen stored in the catalyst 15 per unit time is controlled to a predetermined value while forced lean control is being executed, and the time from the start of the forced lean control until a lean reversal of the output Vox of the oxygen sensor 24 (hereinafter referred to as the "rich continuation time $\Delta$trich") is measured.

Then, if the absolute value $\Delta S$ ($=|\Delta tlean-\Delta trich|$) of a difference between the lean continuation time $\Delta$tlean and the rich continuation time $\Delta$trich is equal to or greater than a predetermined value $\beta$, it is determined that there is a response delay abnormality in one of the rich reversal or the lean reversal of the output Vox of the oxygen sensor 24.

That is, in this example embodiment, the measured lean continuation time $\Delta$tlean is regarded as the oxygen release amount of the catalyst 15 by controlling a target air-fuel ratio such that the amount of oxygen released from the catalyst 15 per unit time becomes constant while the forced rich control is being executed. Also, the measured rich continuation time $\Delta$trich is regarded as the oxygen storage amount of the catalyst 15 by controlling a target air-fuel ratio such that the amount of oxygen stored in the catalyst 15 per unit time becomes constant while the forced lean control is being executed.

Operation and effects similar to the operation and effects (1) to (5) of the first example embodiment described above and the operation and effects (6) of the second example embodiment described above are able to be obtained by the exhaust gas control apparatus of an internal combustion engine according to the example embodiment described above.

Incidentally, the exhaust gas control apparatus of an internal combustion engine of the invention is not limited to the structure illustrated in the foregoing example embodiments. To the contrary, the exhaust gas control apparatus of an internal combustion engine of the invention may also be modified as appropriate, such as in the following manner, for example.

In the first example embodiment and the second example embodiment described above, the maximum oxygen release amount Crlsmax and the maximum oxygen storage amount Cstrgmax are estimated without interruption, but the invention is not limited to this. For example, the maximum oxygen release amount Crlsmax may be estimated after estimating the maximum oxygen storage amount Cstrgmax. Also, normal fuel injection control may be interposed between these estimations.

In the example embodiments described above, the one-sided response delay abnormality determination of the oxygen sensor 24 is made based on a difference between the oxygen release amount estimated by the second estimating portion and the oxygen storage amount estimated by the third estimating portion. However, the invention is not limited to this. For example, the abnormality determination may also be made based on the ratio of the oxygen release amount and the oxygen storage amount.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An exhaust gas control apparatus of an internal combustion engine, comprising:
    a catalyst that is provided in an exhaust passage of an internal combustion engine and is configured to store oxygen;
    an oxygen sensor that is provided on an exhaust gas downstream side of the catalyst in the exhaust passage and is configured to output a signal indicative of an air-fuel ratio of exhaust gas; and
    a controller comprising a first estimating portion, a second estimating portion, a third estimating portion, a fourth estimating portion, and a determining portion;
    the first estimating portion being configured to estimate whether an amount of oxygen stored in the catalyst is a maximum amount or a minimum amount;
    the second estimating portion being configured to execute forced rich control that forcibly makes an air-fuel ratio of exhaust gas that flows into the catalyst richer than a stoichiometric air-fuel ratio when it is estimated by the first estimating portion that the amount of oxygen stored in the catalyst is the maximum amount, and to estimate an amount of oxygen released from the catalyst during a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio, based on the period of time;
    the third estimating portion being configured to execute forced lean control that forcibly makes an air-fuel ratio of exhaust gas that flows into the catalyst leaner than the stoichiometric air-fuel ratio when it is estimated by the first estimating portion that the amount of oxygen stored in the catalyst is the minimum amount, and to estimate an amount of oxygen stored in the catalyst during a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio, based on the period of time;
    the determining portion being configured to determine that there is a response delay abnormality in one of the rich reversal or the lean reversal of the output of the oxygen sensor when a degree of deviation between the oxygen release amount estimated by the second estimating portion and the oxygen storage amount estimated by the third estimating portion is equal to or greater than a predetermined degree; and
    the fourth estimating portion being configured to perform fuel cut control that stops fuel injection in the internal combustion engine when it is estimated by the first estimating portion that the amount of oxygen stored in the catalyst is the minimum amount, and to estimate a response delay time of a lean reversal of the output of the oxygen sensor based on a period of time between a point in time at which the fuel cut control starts and a point in time at which the output of the oxygen sensor makes a lean reversal;
    wherein the third estimating portion takes the response delay time of the lean reversal of the output of the oxygen sensor estimated by the fourth estimating portion into account when estimating the oxygen storage amount.

2. The exhaust gas control apparatus according to claim 1, wherein the second estimating portion estimates an amount of oxygen released from the catalyst per unit time based on an engine operating state, during the period of time between the point in time at which the forced rich control starts and the point in time at which the output of the oxygen sensor makes a rich reversal, and estimates the oxygen release amount by integrating the estimated released oxygen amount over the period of time; and the third estimating portion estimates an amount of oxygen stored in the catalyst per unit time based on the engine operating state, during the period of time between the point in time at which the forced lean control starts and the point in time at which the output of the oxygen sensor makes a lean reversal, and estimates the oxygen storage amount by integrating the estimated stored oxygen amount over the period of time.

3. The exhaust gas control apparatus according to claim 1, wherein the first estimating portion estimates that the amount of oxygen stored in the catalyst is the maximum amount when the oxygen sensor continues to output a value corresponding to an air-fuel ratio that is leaner than the stoichiometric air-fuel ratio for a predetermined period of time.

4. The exhaust gas control apparatus according to claim 1, wherein the first estimating portion estimates that the amount of oxygen stored in the catalyst is the minimum amount when the output of the oxygen sensor makes a rich reversal.

5. An exhaust gas control apparatus of an internal combustion engine, comprising:
   a catalyst that is provided in an exhaust passage of an internal combustion engine and is configured to store oxygen;
   an oxygen sensor that is provided on an exhaust gas downstream side of the catalyst in the exhaust passage and is configured to output a signal indicative of an air-fuel ratio of exhaust gas; and
   a controller comprising a first estimating portion, a second estimating portion, a third estimating portion, a first measuring portion, a second measuring portion, and a determining portion;
   the first estimating portion being configured to estimate whether an amount of oxygen stored in the catalyst is a maximum amount or a minimum amount;
   the first measuring portion being configured to control an amount of oxygen released from the catalyst per unit time to a predetermined amount while forced rich control that forcibly makes an air-fuel ratio of exhaust gas that flows into the catalyst richer than a stoichiometric air-fuel ratio is being executed, when it is estimated by the estimating portion that the amount of oxygen stored in the catalyst is the maximum amount, and to measure a lean continuation time that is a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio;
   the second measuring portion being configured to control an amount of oxygen stored in the catalyst per unit time to a predetermined amount while forced lean control that forcibly makes an air-fuel ratio of exhaust gas that flows into the catalyst leaner than the stoichiometric air-fuel ratio is being executed, when it is estimated by the estimating portion that the amount of oxygen stored in the catalyst is the minimum amount, and to measure a rich continuation time that is a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio;
   the determining portion being configured to determine that there is a response delay abnormality in one of the rich reversal or the lean reversal of the output of the oxygen sensor when a degree of deviation between the lean continuation time measured by the first measuring portion and the rich continuation time measured by the second measuring portion is equal to or greater than a predetermined degree;
   the second estimating portion being configured to perform fuel cut control that stops fuel injection in the internal combustion engine when it is estimated by the first estimating portion that the amount of oxygen stored in the catalyst is the minimum amount, and to estimate a response delay time of a lean reversal of the output of the oxygen sensor based on a period of time between a point in time at which the fuel cut control starts and a point in time at which the output of the oxygen sensor makes a lean reversal; and
   the third estimating portion being configured to execute forced lean control that forcibly makes an air-fuel ratio of exhaust gas that flows into the catalyst leaner than the stoichiometric air-fuel ratio when it is estimated by the first estimating portion that the amount of oxygen stored in the catalyst is the minimum amount, and to estimate an amount of oxygen stored in the catalyst during a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio, based on the period of time;
   wherein the third estimating portion takes the response delay time of the lean reversal of the output of the oxygen sensor estimated by the fourth estimating portion into account when estimating the oxygen storage amount.

6. A method for determining an abnormality in an exhaust gas control apparatus of an internal combustion engine, comprising:
   utilizing a controller to:
      estimate whether an amount of oxygen stored in a catalyst that is included in an exhaust gas control apparatus of an internal combustion engine, is provided in an exhaust passage of the internal combustion engine, and is capable of storing oxygen is a maximum amount or a minimum amount according to output of an oxygen sensor that is included in the exhaust gas control apparatus of the internal combustion engine and provided on an exhaust gas downstream side of the catalyst in the exhaust passage;
      execute forced rich control that forcibly makes an air-fuel ratio of exhaust gas that flows into the catalyst richer than a stoichiometric air-fuel ratio, when it is estimated that the amount of oxygen stored in the catalyst is the maximum amount;
      estimate an amount of oxygen released from the catalyst during a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio, based on the period of time;

execute forced lean control that forcibly makes an air-fuel ratio of exhaust gas flowing into the catalyst leaner than the stoichiometric air-fuel ratio, when it is estimated that the amount of oxygen stored in the catalyst is the minimum amount;

estimate an amount of oxygen stored in the catalyst during a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio, based on the period of time;

determine that there is a response delay abnormality in one of the rich reversal or the lean reversal of the output of the oxygen sensor when a degree of deviation between the estimated oxygen release amount and the estimated oxygen storage amount is equal to or greater than a predetermined degree;

perform fuel cut control that stops fuel injection in the internal combustion engine when it is estimated by the first estimating portion that the amount of oxygen stored in the catalyst is the minimum amount, and to estimate a response delay time of a lean reversal of the output of the oxygen sensor based on a period of time between a point in time at which the fuel cut control starts and a point in time at which the output of the oxygen sensor makes a lean reversal, and take the response delay time of the lean reversal of the output of the oxygen sensor into account when estimating the oxygen storage amount.

7. A method for determining an abnormality in an exhaust gas control apparatus of an internal combustion engine, comprising:

utilizing a controller to:

estimate whether an amount of oxygen stored in a catalyst that is included in an exhaust gas control apparatus of an internal combustion engine, is provided in an exhaust passage of the internal combustion engine, and is capable of storing oxygen is a maximum amount or a minimum amount according to output of an oxygen sensor that is included in the exhaust gas control apparatus of the internal combustion engine and provided on an exhaust gas downstream side of the catalyst in the exhaust passage;

control an amount of oxygen released from the catalyst per unit time to a predetermined amount while forced rich control that forcibly makes an air-fuel ratio of exhaust gas that flows into the catalyst richer than a stoichiometric air-fuel ratio is being executed, when it is estimated that the amount of oxygen stored in the catalyst is the maximum amount, and measuring a lean continuation time that is a period of time between a point in time at which the forced rich control starts and a point in time at which the output of the oxygen sensor makes a rich reversal from a value corresponding to an air-fuel ratio that is leaner than the stoichiometric air-fuel ratio to a value corresponding to an air-fuel ratio that is richer than the stoichiometric air-fuel ratio;

control an amount of oxygen stored in the catalyst per unit time to a predetermined amount while forced lean control that forcibly makes an air-fuel ratio of exhaust gas that flows into the catalyst leaner than the stoichiometric air-fuel ratio is being executed, when it is estimated that the amount of oxygen stored in the catalyst is the minimum amount, and measuring a rich continuation time that is a period of time between a point in time at which the forced lean control starts and a point in time at which the output of the oxygen sensor makes a lean reversal from a value corresponding to an air-fuel ratio that is richer than the stoichiometric air-fuel ratio to a value corresponding to an air-fuel ratio that is leaner than the stoichiometric air-fuel ratio;

determine that there is a response delay abnormality in one of the rich reversal or the lean reversal of the output of the oxygen sensor when a degree of deviation between the measured lean continuation time and the measured rich continuation time is equal to or greater than a predetermined degree;

perform fuel cut control that stops fuel injection in the internal combustion engine when it is estimated by the first estimating portion that the amount of oxygen stored in the catalyst is the minimum amount, and to estimate a response delay time of a lean reversal of the output of the oxygen sensor based on a period of time between a point in time at which the fuel cut control starts and a point in time at which the output of the oxygen sensor makes a lean reversal; and take the response delay time of the lean reversal of the output of the oxygen sensor into account when estimating the oxygen storage amount.

\* \* \* \* \*